United States Patent
Xu et al.

(10) Patent No.: US 12,264,104 B2
(45) Date of Patent: Apr. 1, 2025

(54) MULTI-COMPONENT COMPOSITION FOR MANUFACTURING POLYURETHANE/UREA CEMENTITIOUS HYBRID SYSTEMS

(71) Applicant: SIKA TECHNOLOGY AG, Baar (CH)

(72) Inventors: Hang Xu, Chigasaki (JP); Jie Shen, Shanghai (CN); ShengZhong Zhou, Shanghai (CN); Stefan Hirsemann, Shanghai (CN); Andrew Tasker, Redditch (GB); Josef Weichmann, Trostberg (DE); Lei Guo, Shanghai (CN)

(73) Assignee: SIKA TECHNOLOGY AG, Baar (CH)

( * ) Notice: Subject to any disclaimer, the term of this patent is extended or adjusted under 35 U.S.C. 154(b) by 839 days.

(21) Appl. No.: 17/425,056

(22) PCT Filed: Jan. 31, 2020

(86) PCT No.: PCT/EP2020/052439
§ 371 (c)(1),
(2) Date: Jul. 22, 2021

(87) PCT Pub. No.: WO2020/164928
PCT Pub. Date: Aug. 20, 2020

(65) Prior Publication Data
US 2022/0098102 A1     Mar. 31, 2022

(30) Foreign Application Priority Data
Feb. 12, 2019 (WO) ................ PCT/CN2019/074861

(51) Int. Cl.
C04B 24/28 (2006.01)
C04B 28/04 (2006.01)
C04B 40/00 (2006.01)
C04B 103/00 (2006.01)
C08G 18/12 (2006.01)
C08G 18/18 (2006.01)
C08K 5/10 (2006.01)

(52) U.S. Cl.
CPC ............ *C04B 24/282* (2013.01); *C04B 28/04* (2013.01); *C04B 40/0046* (2013.01); *C08G 18/12* (2013.01); *C08G 18/1825* (2013.01); *C08K 5/10* (2013.01); *C04B 2103/0046* (2013.01)

(58) Field of Classification Search
CPC ... C04B 24/282; C04B 28/04; C04B 40/0046; C04B 2103/0046; C04B 2103/0094; C04B 28/10; C04B 28/02; C04B 2111/00508; C04B 2111/00586; C04B 2111/27; C04B 2111/60; C04B 2111/70; C08G 18/12; C08G 18/1825; C08G 5/10
See application file for complete search history.

(56) References Cited

U.S. PATENT DOCUMENTS 3,763,070 A  10/1973  Shearing

FOREIGN PATENT DOCUMENTS

| EP | 0 383 492 A2 | 8/1990 |
|---|---|---|
| EP | 3339344 A1 | 6/2018 |
| JP | H08169740 A | 7/1996 |
| JP | 2006-206354 A | 8/2006 |
| JP | 2009029682 A | 2/2009 |
| JP | 2018-203577 A | 12/2018 |
| RU | 2515955 C2 | 5/2014 |
| WO | 2014174093 A1 | 10/2014 |
| WO | 2015173214 A1 | 11/2015 |

OTHER PUBLICATIONS

International Search Report for PCT/EP2020/052439 dated Apr. 28, 2020.
Written Opinion for PCT/EP2020/052439 dated Apr. 28, 2020.

*Primary Examiner* — Anthony J Green
(74) *Attorney, Agent, or Firm* — Oliff PLC

(57) ABSTRACT

The invention relates to a multi-component composition for the manufacture of polyurethane/urea cementitious hybrid system, comprising at least one isocyanate component selected from the group consisting of monoisocyanate, polyisocyanate and NCO terminated prepolymer, at least one polyol, water, catalyst, at least one acidic additive, and hydraulic binder, wherein the acidic additive is at least one selected from the group consisting of Lewis acids, acid precursors and acidic buffers and is in an amount of 0.01 to 3 wt %, based on the total weight of the composition, to the preparation thereof, and to the use of the composition for the preparation of a flooring, waterproofing, screed, grouting, primer, wall paint, roofing or coating in construction applications.

26 Claims, No Drawings

MULTI-COMPONENT COMPOSITION FOR MANUFACTURING POLYURETHANE/UREA CEMENTITIOUS HYBRID SYSTEMS

CROSS REFERENCE TO RELATED APPLICATIONS

This application is a national stage application of International Application No. PCT/EP2020/052439, filed Jan. 31, 2020, which claims priority from International Application No. PCT/CN2019/074861, filed Feb. 12, 2019, both of which applications are incorporated herein by reference.

TECHNICAL FIELD

The present invention relates to a multi-component composition for the manufacture of polyurethane/urea cementitious hybrid systems, to the preparation thereof, and to the use of the composition for the preparation of a flooring, waterproofing, screed, primer, wall paint, grouting, roofing or coating in construction applications.

BACKGROUND

Polyurethane/urea cementitious hybrid systems have been widely applied in construction applications, such as in self-leveling fields or waterproofing fields. There are three main reactions in polyurethane/urea cementitious hybrid systems: isocyanate reactions including polyol/isocyanate reaction (i.e. polyurethane reaction) and $H_2O$/isocyanate reaction (i.e. urea reaction), and cement hydration. Catalysts such as amine-based catalysts or catalysts based on organic metal compounds are currently incorporated in the system to accelerate the isocyanate reactions. The alkaline fillers in the cement also create a favorable condition for the isocyanate reactions. The fast isocyanate reactions will bring the challenge that the workers must finish the application process within a short period of time (eg. 15-25 minutes), leaving a critically narrow working window. Thus, an extended working time of the polyurethane/urea cementitious hybrid systems is essentially needed in the market.

Naturally, the retardation of polyurethane or urea reactions in a polyurethane/urea cementitious hybrid system could be achieved by reducing the dosage of reactive isocyanates or catalysts. However, this approach will adversely affect the final properties of the system, such as insufficient overnight cure or poor final hardness.

U.S. Pat. No. 3,763,070A discloses cement compositions suitable for flooring applications which comprise a hydraulic cement, a silica filler, water, an organic polyisocyanate and a compound or mixture of compounds selected from monohydric alcohols, monocarboxylic acids having a molecular weight of at least 60 and compounds which contain on average at least one epoxy group per molecule. The presence of the monohydric alcohols, monocarboxylic acids or epoxy compounds delays the rate of setting of the compositions, thus extending the working time from 2 hours to 3~6 hours. For instance, epoxy groups do not undergo direct reaction with isocyanate groups. Instead, they react with the reaction product of water and isocyanate groups, i.e. liberated primary amino groups, and take part in the curing of the compositions. The epoxy compounds therefore serve as additional cross-linking agents, adding to the polymer network built up by normal isocyanate reaction with water and any other isocyanate-reactive material which may be present. These additional compounds act as main reactive raw materials and would affect some of the final performances of the cured samples, hence rendering the cementitious hybrid system complicated and hard to adjust to different applications. Besides, the disclosed polyurethane cementitious hybrid system differs from state-of-art technology in that it doesn't comprise any catalyst, so the setting time is as long as several hours.

Therefore, it is still required to provide a multi-component composition for the manufacture of polyurethane/urea cementitious hybrid systems that have extended working time at the presence of catalyst and preserves excellent overnight cure and final performance (eg. hardness) by the addition of a small quantity of additives.

SUMMARY OF THE PRESENT INVENTION

An object of this invention is to overcome the problems of the prior art discussed above and to provide a multi-component composition for the manufacture of polyurethane/urea cementitious hybrid systems that have extended working time while, at the same time, preserves excellent overnight cure and final hardness.

Surprisingly, it has been found by the inventors that the above objects can be achieved by a multi-component composition comprising:
(A) at least one isocyanate component selected from the group consisting of monoisocyanate, polyisocyanate and NCO terminated prepolymer;
(B) at least one organic isocyanate-reactive compound selected from the group consisting of polyol, polyamide, polyamine, and polyesteramide;
(C) water;
(D) catalyst;
(E) at least one acidic additive; and
(F) hydraulic binder;
wherein the at least one acidic additive (E) is at least one selected from the group consisting of Lewis acids, acid precursors and acidic buffers.

In a preferred embodiment, the at least one acidic additive (E) is added in an amount of from 0.01 to 3 wt %, preferably from 0.05 to 2 wt %, and more preferably from 0.1 to 1.5 wt %, even more preferably from 0.1 to 1 wt %, based on the total weight of the multi-component composition.

In a preferred embodiment, the acidic additive is at least one selected from compounds having the general formula (I), (II), (III) or (IV):

$R_1-(COOH)_n$ (I) or $R_1-COOCO-R_2$ (II) or $R_1-COOR_3$ (III) or $R_1-SO_3H$ (IV)

wherein $R_1$, $R_2$ and $R_3$ are independently from each other selected from the group consisting of $C_1$-$C_{30}$-alkyl, $C_2$-$C_{30}$-alkenyl, $C_3$-$C_{30}$-cyclolalkyl, $C_3$-$C_{30}$-heterocyclyl, $C_3$-$C_{30}$-heterocyclyl-$C_1$-$C_{30}$-alkyl, $C_6$-$C_{30}$-aryl, $C_6$-$C_{30}$-aryl-$C_1$-$C_{30}$-alkyl, $C_2$-$C_{30}$-heteroaryl, $C_2$-$C_{30}$-heteroaryl-$C_1$-$C_{30}$-alkyl, and $C_1$-$C_{30}$-alkoxy-$C_1$-$C_{30}$-alkyl, each of which radicals is optionally substituted by halogen, cyano, nitro, $C_1$-$C_6$-alkyl, oxo, acyl, or $C_3$-$C_6$-cycloalkyl, with the heteroatom being selected from N, O and S, or $R_1$ and $R_2$, or $R_1$ and $R_3$, together with the carbon and oxygen atoms attached thereto, form a saturated or unsaturated 5- to 10-membered hetero ring, the ring being optionally fused with phenyl, with $R_1$-$R_3$ being optionally replaced by heteroatoms selected from N, O and S, and being optionally substituted by halogen, cyano, nitro, $C_1$-$C_6$-alkyl, oxo, acyl, or $C_3$-$C_6$-cycloalkyl; and n is an integer of 1-3.

In another preferred embodiment, the acidic additive is selected from diketones. The diketones may be selected from the compounds having the general formula (V):

$$R_5-C(O)-CHR_4-C(O)-R_6 \quad (V)$$

wherein $R_4$ is selected from H and $C_1$-$C_8$-alkyl, $R_5$ and $R_6$ are independently from each other selected from $C_1$-$C_6$-alkyl and $C_1$-$C_8$-alkoxy, or $R_5$ and $R_4$, or $R_5$ and $R_6$, together with the carbon atoms attached, form a 5- to 8-membered ring or hetero ring, with the ring member optionally replaced by N or O, and the ring member optionally substituted by $C_1$-$C_6$-alkyl, cyano, amino, hydroxyl, or oxo group.

In a further aspect, the invention relates to a polyurethane/urea cementitious hybrid system comprising the multi-component composition according to the invention.

In a further aspect, the invention relates to a process for preparing a flooring, waterproofing, screed, grouting, primer, wall paint, roofing or coating, comprising the steps of:

mixing the components (A)-(F) to form a mixture;
applying the mixture onto a substrate; and
curing the applied mixture to form a flooring, waterproofing, screed, grouting, primer, wall paint, roofing or coating on the substrate.

It has been surprisingly found in this application that, by adding the specific acidic additives with a particular range of amounts into the multi-component composition, the thus-obtained polyurethane/urea cementitious hybrid system has a substantially extended working time, and the flooring, screed, primer, wall paint, roofing or coating obtained thereby has excellent hardness and overnight cure.

Thus, in a still further aspect, the invention relates to the use of the multi-component composition or the polyurethane/urea cementitious hybrid system for the preparation of a flooring, screed, grouting, primer, wall paint, roofing or coating.

In a still further aspect, the invention relates to the flooring, screed, grouting, primer, wall paint, roofing or coating obtainable or obtained by the multi-component composition or the polyurethane/urea cementitious hybrid system.

DETAILED DESCRIPTION OF THE PRESENT INVENTION

Unless defined otherwise, all technical and scientific terms used herein have the meaning commonly understood by a person skilled in the art to which the invention belongs. As used herein, the following terms have the meanings ascribed to them below, unless specified otherwise.

As used herein, the articles "a" and "an" refer to one or to more than one (i.e., to at least one) of the grammatical object of the article. By way of example, "an element" means one element or more than one element.

As used herein, the term "about" is understood to refer to a range of numbers that a person of skill in the art would consider equivalent to the recited value in the context of achieving the same function or result.

As used herein, the term "multi-component" refers to a composition comprising two or more components, each of which may also be a mixture of several compounds. Part of the multi-components can be blended together if needed, and the multi-components may also be several independent packages that can be mixed on the spot for applications.

As used herein, the term "prepolymer" refers to a monomer or system of monomers that have been reacted to an intermediate molecular mass state. This material is capable of further polymerization by reactive groups to a fully cured high molecular weight state. It is also called "polymer precursor".

As used herein, the term "acid precursor" refers to a compound that gives an acid by certain reaction, such as anhydrides, esters or lactones.

As used herein, the term "additives" refers to additives included in a formulated system to enhance physical or chemical properties thereof and to provide a desired result. Such additives include, but are not limited to, dyes, pigments, toughening agents, impact modifiers, rheology modifiers, plasticizing agents, thixotropic agents, natural or synthetic rubbers, filler agents, reinforcing agents, thickening agents, opacifiers, inhibitors, fluorescence or other markers, thermal degradation reducers, thermal resistance conferring agents, surfactants, wetting agents, defoaming agents, dispersants, flow or slip aids, biocides, and stabilizers.

As used herein, the term "alkyl", either on its own or else in combination with further terms, for example haloalkyl, is understood as meaning a radical of a saturated aliphatic hydrocarbon group and may be branched or unbranched, for example methyl, ethyl, propyl, butyl, isobutyl, pentyl, hexyl, heptyl, octyl, nonyl, decyl, undecyl or dodecyl, or an isomer thereof.

As used herein, the term "alkenyl", either on its own or else in combination with further terms, for example haloalkenyl, is understood as meaning a straight-chain or branched radical which has at least one double bond, for example vinyl, allyl, propenyl, butenyl, butadienyl, pentenyl, pentadienyl, hexenyl, or hexadienyl, or an isomer thereof.

As used herein, the term "cycloalkyl", either on its own or else in combination with further terms, is understood as meaning a fused or non-fused, saturated, monocyclic or polycyclic hydrocarbon ring, for example cyclopropyl, cyclobutyl, cyclopentyl, cyclohexyl, cycloheptyl, or cyclooctyl, or an isomer thereof.

As used herein, the term "alkoxy", either on its own or else in combination with further terms, for example haloalkoxy, is understood as meaning linear or branched, saturated, group having a formula —O-alkyl, in which the term "alkyl" is as defined above, for example methoxy, ethoxy, propoxy, butoxy, pentoxy, or hexoxy, or an isomer thereof.

As used herein, the term "aryl", either on its own or else in combination with further terms, for example arylalkyl, is understood to include fused or non-fused aryl, such as phenyl or naphthyl, wherein phenyl is optionally substituted by 1 to 5 groups, and naphtyl is optionally substituted by 1 to 7 groups.

As used herein, the term "hetero-" is understood as meaning a saturated or unsaturated radical which is interrupted by at least one heteroatom selected from the group consisting of oxygen (O), nitrogen (N), and sulphur (S).

As used herein, the term "heterocyclyl" is understood as including aliphatic or aromatic heterocyclyl, for example heterocyclylalkyl or heterocyclylalkenyl.

The term "substituted" means that one or more hydrogens on the designated atom is replaced with a selection from the indicated group, provided that the designated atom's normal valency under the existing circumstances is not exceeded, and that the substitution results in a stable compound. Combinations of substituents and/or variables are permissible only if such combinations result in stable compounds.

The term "optionally substituted" means optional substitution with the specified groups, radicals or moieties. Unless stated otherwise, optionally substituted radicals may be mono- or poly-substituted, where the substituents in the case of poly-substituted may be the same or different.

As used herein, the groups with suffix "-ene" represent the groups have two covalent bond which could be linked to other radicals, for example —$CH_2CH(CH_3)CH_2$-(isobutylene),

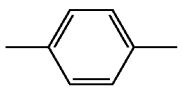

(phenylene), and in the case of phenylene, the covalent bond may be located in ortho-, meta-, or para-position.

Unless otherwise identified, all percentages (%) are "percent by weight".

The radical definitions or elucidations given above in general terms or within areas of preference apply to the end products and correspondingly to the starting materials and intermediates. These radical definitions can be combined with one another as desired, i.e. including combinations between the general definition and/or the respective ranges of preference and/or the embodiments.

All the embodiments and the preferred embodiments disclosed herein can be combined as desired, which are also regarded as being covered within the scope of the present invention.

Unless otherwise identified, the temperature refers to room temperature and the pressure refers to ambient pressure.

In one aspect, the present invention provides a multi-component composition comprising:
(A) at least one isocyanate component selected from the group consisting of monoisocyanate, polyisocyanate and NCO terminated prepolymer;
(B) at least one organic isocyanate-reactive compound selected from the group consisting of polyol, polyamide, polyamine, and polyesteramide;
(C) water;
(D) catalyst;
(E) at least one acidic additive; and
(F) hydraulic binder;
wherein the at least one acidic additive (E) is at least one selected from the group consisting of Lewis acids, acid precursors and acidic buffers.

Isocyanate Component (A)

As component (A), any monoisocyanate, polyisocyanate and/or NCO terminated prepolymer that are conventionally used for preparing polyurethane resin can be used herein. Suitable monoisocyanate can be all of the aliphatic, cycloaliphatic, and aromatic monoisocyanates, including, but not limited to, n-hexylisocyanate, cyclohexylisocyanate, hexamethylene isocyanate, 2-ethyl hexylisocyanate, n-octyl isocyanate, deodecyl-isocyanate, stearylisocyanate, benzyl isocyanate, and mixtures thereof.

As polyisocyanates which may be used, there may be mentioned aliphatic, cycloaliphatic, araliphatic, and aromatic di- or polyfunctional isocyanates known for the production of polyurethanes, and also any desired mixtures thereof. Examples are diphenylmethane 4,4'-diisocyanate, diphenylmethane 2,4'-diisocyanate, the mixtures of monomeric diphenylmethane diisocyanates with diphenylmethane diisocyanate homologs having a larger number of rings (polymer MDI), tetramethylene diisocyanate, hexamethylene diisocyanate (HDI), 2,2,4- and 2,4,4-trimethylhexamethylene diisocyanates, dicyclohexylmethane diisocyanates, 3-isocyanatomethyl-3,5,5-trimethylcyclohexyl isocyanate, xylylene diisocyanate, mixtures of hexamethylene diisocyanates with oligomeric or polymeric homologs of hexamethylene diisocyanate (polynuclear HDI), isophorone diisocyanate (IPDI), tolylene 2,4- or 2,6-diisocyanate (TDI), and mixtures of two or more of these isocyanates. It is preferable to use tolylene diisocyanate (TDI) and diphenylmethane diisocyanate (MDI). The above-mentioned isocyanates can also have been modified, for example via incorporation of uretedione, carbamate, isocyanurate, carbodiimide, allophanate, and in particular urethane groups.

Isocyanates used herein can also be isocyanate prepolymers containing NCO end groups. These isocyanate prepolymers are obtainable by reacting di- or polyisocyanates described above, for example at temperatures of from 30 to 100° C., preferably at about 80° C., with isocyanate-reactive compound such as polyols to give the prepolymer. These prepolymers may have an isocyanate content of 2 to 25 wt % and a number average molecular weight of about 500 to about 30,000. It is preferable to produce the prepolymers of the invention by using 4,4'-MDI together with uretonimine-modified MDI and with commercially available polyols based on polyesters, for example deriving from adipic acid, or polyethers, for example deriving from ethylene oxide and/or propylene oxide.

Polyols that can be used for the production of isocyanate prepolymers are known to the person skilled in the art and are described by way of example in "Kunststoffhandbuch, Band 7, Polyurethane" [Plastics handbook, volume 7, Polyurethanes], Carl Hanser Verlag, 3rd edition 1993, chapter 3.1. It is preferable here that polyols used for the production of isocyanate prepolymers are those included in the description relating to organic isocyanate-reactive compound (B).

Organic Isocyanate-Reactive Component (B)

It is possible to use, as organic isocyanate-reactive compound (B), any of the known compounds use for the production of polyurethane, being selected from the group consisting of polyol, polyamide, polyamine, and polyesteramide. It is preferred to use polyols having at least two hydroxyl groups, for example those with functionality from 2 to 8. By way of example, it is possible to use compounds selected from the group of polyhydric alcohol, aminoalcohol, hydroxyl-ended polyether (polyether polyol), polyester (polyester polyol) or polycarbonate (polycarbonate polyol) and mixtures thereof.

Polyether polyols are by way of example produced from epoxides, for example propylene oxide and/or ethylene oxide, or from tetrahydrofuran with starter compounds exhibiting hydrogen-activity, for example aliphatic alcohols, phenols, amines, carboxylic acids, water, or compounds based on natural substances, for example sucrose, sorbitol or mannitol, with use of a catalyst. As polyester polyols, it is preferred to use a dihydric or trihydric polyether having an equivalent weight of from about 100 to about 1500.

Polyester polyols are by way of example produced from aliphatic or aromatic dicarboxylic acids and polyhydric alcohols, polythioether polyols, polyesteramides, hydroxylated polyacetals, and/or hydroxylated aliphatic polycarbonates, preferably in the presence of an esterification catalyst.

Polycarbonate polyols include those prepared by the reaction of diols, such as 1,3-propanediol, 1,4-butanediol, diethylene glycol, triethylene glycol or thiodiglycol with phosphine or diarylcarbonate, such as diophenyl carbonate.

These polymeric polyols may have a number average molecular weight of about 400 to about 15000.

Low molecular polyols can also be added for use as chain extenders or crosslinkers. Low molecular polyols refer to monomeric polyols with molecular weight of less than 400 and at least two hydroxyl groups. Suitable polyols with low molecular weight are in particular diols, triols or both, in each case having molecular weights of less than 350, preferably from 60 to 300 and in particular from 60 to 250. It is possible to use, for example, aliphatic, cycloaliphatic and/or aromatic diols having from 2 to 14, preferably from 2 to 10, carbon atoms, e.g. ethylene glycol, 1,2-, 1,3-propanediol, 1,2-, 1,3-pentanediol, 1,10-decanediol, 1,2-, 1,3-, 1,4-dihydroxycyclohexane, diethylene glycol and triethylene glycol, dipropylene glycol and tripropylene glycol, 1,4-butanediol, 1,6-hexanediol and bis(2-hydroxyethyl)hydroquinone, triols such as 1,2,4-, 1,3,5-trihydroxycyclohexane, glycerol and trimethylolpropane and low molecular weight hydroxyl-comprising polyalkylene oxides based on ethylene oxide and/or 1,2-propylene oxide and the abovementioned diols and/or triols as starter molecules.

Other possible polyols are mentioned by way of example in "Kunststoffhandbuch [Plastics handbook], volume 7, Polyurethane [Polyurethanes]", Carl Hanser Verlag, $3^{rd}$ edition 1993, chapter 3.1.

Among the polyols listed above, castor oil is particularly mentioned and preferred.

Water (C)

The multi-component composition comprises water to take part in the hydration reactions of urea and of hydraulic binder. Concerning water, there is no particular limitation. Mineral water, deionized water or tap water can be used. Preferably, deionized water is used.

Catalyst (D)

As catalyst (D), it is possible to use all compounds which accelerate the polyurethane reaction or urea reaction. Such compounds are known and are described, for example, in "Kunststoffhandbuch, volume 7, Polyurethane", Carl Hanser Verlag, 3rd edition 1993, chapter 3.4.1. Preferably, catalyst (D) comprises alkaline catalyst such as amine-based catalysts and catalysts based on organic metal compounds.

As catalysts based on organic metal compounds, it is possible to use, for example, organic tin compounds such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates, e.g. bismuth(III) neodecanoate, bismuth 2-ethylhexanoate and bismuth octanoate, or alkali metal salts of carboxylic acids, e.g. potassium acetate or potassium formate.

Preference is given to using a mixture comprising at least one tertiary amine as catalyst (D). These tertiary amines are usually compounds which can also bear groups which are reactive toward isocyanate, e.g. OH, NH or $NH_2$ groups. Some of the most frequently used catalysts are bis(2-dimethylaminoethyl) ether, N,N,N,N,N-pentamethyldiethylenetriamine, N,N,N-triethylaminoethoxyethanol, N,N,N',N'-Tetrakis(2-hydroxyethyl)ethylenediamine, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene, diazabicyclononene, 2,2'-dimorpholinodiethylether, N,N,N'-trimethyl-N'-hydroxyethyl-bisaminoethylether, N,N,N'-trimethylaminoethyl-ethanolamine, N,N,N',N'-Tetrakis(2-hydroxypropyl)ethylenediamine, N,N-bis(3-dimethylaminopropyl)-N-isopropanolamine, and N-(3-dimethylaminopropyl)-N,N-diisopropanolamine, or mixtures thereof.

Acidic Additive Component (E)

Acidic additive component (E) is at least one selected from Lewis acids, acid precursors and acidic buffers. As Lewis acid, preference is given to carboxylic acids, sulfonic acids and diketones. Suitable acid precursors include carboxylic anhydrides, carboxylic esters or lactones. Suitable lactones are, preferably, 2-acetylbutyrolactone or ε-caprolactone. As to acidic buffer, preference is given to the buffer systems with a pH value below 4, formed of carboxylic acids and phosphorus-containing compounds, such as $Na_2HPO_4$/citric acid.

In a preferred embodiment, the acidic additive is at least one selected from compounds having the general formula of (I), (II), (III) or (IV): $R_1$—$(COOH)_n$ (I) or $R_1$—COOCO—$R_2$ (II) or $R_1$—$COOR_3$ (III) or $R_1$—$SO_3H$ (IV)

wherein $R_1$, $R_2$ and $R_3$ are independently from each other selected from the group consisting of $C_1$-$C_{30}$-alkyl, $C_2$-$C_{30}$-alkenyl, $C_3$-$C_{30}$-cyclolalkyl, $C_3$-$C_{30}$-heterocyclyl, $C_3$-$C_{30}$-heterocyclyl-$C_1$-$C_{30}$-alkyl, $C_6$-$C_{30}$-aryl, $C_6$-$C_{30}$-aryl-$C_1$-$C_{30}$-alkyl, $C_2$-$C_{30}$-heteroaryl, $C_2$-$C_{30}$-heteroaryl-$C_1$-$C_{30}$-alkyl, and $C_1$-$C_{30}$-alkoxy-$C_1$-$C_{30}$-alkyl, each of which radicals is optionally substituted by halogen, cyano, nitro, $C_1$-$C_6$-alkyl, oxo, acyl, or $C_3$-$C_6$-cycloalkyl, with the heteroatom being selected from N, O and S, or $R_1$ and $R_2$, or $R_1$ and $R_3$, together with the carbon and oxygen atoms attached thereto, form a saturated or unsaturated 5- to 10-membered hetero ring, the ring being optionally fused with phenyl, with $R_1$-$R_3$ being optionally replaced by heteroatoms selected from N, O and S, and being optionally substituted by halogen, cyano, nitro, $C_1$-$C_6$-alkyl, oxo, acyl, or $C_3$-$C_6$-cycloalkyl;

n is an integer of 1-3.

Preferably, $R_1$, $R_2$ and $R_3$ are independently from each other selected from the group consisting of $C_1$-$C_{15}$-alkyl, $C_2$-$C_{15}$-alkenyl, $C_3$-$C_{15}$-cyclolalkyl, $C_3$-$C_{15}$-heterocyclyl, $C_3$-$C_{15}$-heterocyclyl-$C_1$-$C_{15}$-alkyl, $C_6$-$C_{15}$-aryl, $C_6$-$C_{15}$-aryl-$C_1$-$C_{15}$-alkyl, $C_2$-$C_{15}$-heteroaryl, $C_2$-$C_{15}$-heteroaryl-$C_1$-$C_{15}$-alkyl, and $C_1$-$C_{15}$-alkoxy-$C_1$-$C_{15}$-alkyl, each of which radicals is optionally substituted by halogen, cyano, nitro, $C_1$-$C_6$-alkyl, oxo, acyl, or $C_3$-$C_6$-cycloalkyl, with the heteroatom being selected from N, O and S, or $R_1$ and $R_2$, or $R_1$ and $R_3$, together with the carbon and oxygen atoms attached thereto, form a saturated or unsaturated 5- to 10-membered hetero ring, the ring being optionally fused with phenyl, with $R_1$-$R_3$ being optionally replaced by heteroatoms selected from N, O and S, and being optionally substituted by halogen, cyano, nitro, $C_1$-$C_6$-alkyl, oxo, acyl, or $C_3$-$C_6$-cycloalkyl; and n is an integer of 1-3.

Preferably, $R_1$, $R_2$ and $R_3$ are independently from each other selected from the group consisting of $C_1$-$C_{10}$-alkyl, $C_2$-$C_{10}$-alkenyl, $C_3$-$C_{10}$-cyclolalkyl, $C_3$-$C_{10}$-heterocyclyl, $C_3$-$C_{10}$-heterocyclyl-$C_1$-$C_{10}$-alkyl, $C_6$-$C_{10}$-aryl, $C_6$-$C_{10}$-aryl-$C_1$-$C_{10}$-alkyl, $C_2$-$C_{10}$-heteroaryl, $C_2$-$C_{10}$-heteroaryl-$C_1$-$C_{10}$-alkyl, and $C_1$-$C_{10}$-alkoxy-$C_1$-$C_{10}$-alkyl, each of which radicals is optionally substituted by halogen, cyano, nitro, $C_1$-$C_6$-alkyl, oxo, acyl, or $C_3$-$C_6$-cycloalkyl, with the heteroatom being selected from N, O and S, or $R_1$ and $R_2$, or $R_1$ and $R_3$, together with the carbon and oxygen atoms attached thereto, form a saturated or unsaturated 5- to 10-membered hetero ring, the ring being optionally fused with phenyl, with $R_1$-$R_3$ being optionally replaced by heteroatoms selected from N, O and S, and being optionally substituted by halogen, cyano, nitro, $C_1$-$C_6$-alkyl, oxo, acyl, or $C_3$-$C_6$-cycloalkyl; and n is an integer of 1-2.

In a further preferred embodiment, $R_1$ and $R_2$ are independently from each other selected from the group consisting of $C_3$-$C_6$-alkyl, $C_3$-$C_6$-alkenyl, and $C_3$-$C_6$-cyclolalkyl, each of which radicals is optionally substituted by halogen, cyano, nitro, $C_1$-$C_6$-alkyl, oxo, or acetyl, $R_3$ is $C_1$-$C_6$-alkyl; and n is 1.

In another preferred embodiment, $R_1$ and $R_2$, or $R_1$ and $R_3$, together with the carbon and oxygen atoms attached thereto, form a saturated or unsaturated 5- to 10-membered hetero ring, the ring being optionally fused with phenyl, with $R_1$-$R_3$ being optionally replaced by N, and being optionally substituted by halogen, cyano, nitro, $C_1$-$C_6$-alkyl, oxo, or acetyl.

Suitable compounds of general formula (I), (II), (III) or (IV) that can be mentioned as the acidic additive include acrylic acid, methacrylic acid, oleic acid, succinic acid, sebacic acid, phosphoric acid, gluconic acid, 1,3-dimethylbarbituric acid, benzene sulfonic acid, acetic anhydride, propionic anhydride, acrylic anhydride, methacrylic anhydride, butyric anhydride, isobutyric anhydride, crotonic anhydride, valeric anhydride, hexanoic anhydride, isatoic anhydride, diglycolic anhydride, terepthalic anhydride, maleic anhydride, methyl 2-oxocyclopentanecarboxylate, 2-acetylcyclopentanone and ε-caprolactone. Among those compounds, butyric anhydride, isobutyric anhydride, valeric anhydride, hexanoic anhydride, ε-caprolactone, methacrylic anhydride, methacrylic acid, isatoic anhydride, oleic acid, methyl 2-oxo cyclopentanecarboxylate, and 2-acetylbutyrolactone are preferred.

In another preferred embodiment, the acidic additive is selected from diketones. The diketones may be selected from the compounds having the general formula (V):

$$R_5—C(O)—CHR_4—C(O)—R_6 \quad (V)$$

wherein $R_4$ is selected from H and $C_1$-$C_8$-alkyl, $R_5$ and $R_6$ are independently from each other selected from $C_1$-$C_8$-alkyl and $C_1$-$C_8$-alkoxy, or $R_5$ and $R_4$, or $R_5$ and $R_6$, together with the carbon atoms attached, form a 5- to 8-membered ring or hetero ring, with the ring member optionally replaced by N or O, and the ring member optionally substituted by $C_1$-$C_6$-alkyl, cyano, amino, hydroxyl, or oxo group.

Preferred diketones that can be mentioned include 2-acetylcyclopentanone and 1,3-dimethylbarbituric acid.

The acidic additive is added in an amount of from 0.01 to 3 wt %, preferably from 0.01 to 2 wt %, and more preferably from 0.02 to 1.5 wt %, and even more preferably from 0.05 to 1 wt %, based on the total weight of the multi-component composition. If the added amount is lower than 0.01 wt %, the extending effect of the working time is not enough, and if the amount of the acidic additive exceeds 3 wt %, the working time might even be shortened. Moreover, if the acidic additive is selected from acids (e.g., carboxylic acids, or sulfonic acids), the amount thereof is preferably within 0.01-1.5 wt %, preferably 0.02-1.2 wt %, and more preferably 0.05-1 wt %; if the acidic additive is selected from anhydrides (e.g., carboxylic anhydrides), esters (e.g., carboxylic esters), lactones or diketones, the amount thereof is preferably within 0.05-3 wt %, preferably 0.1-2 wt %, and more preferably 0.2-1.5 wt %, all based on the total weight of the composition.

Hydraulic Binder Component (F)

Hydraulic binder refers to a class of structural materials which are applied in admixture with water and thereafter harden or set as a result of physical or chemical changes which consume the water present. Hydraulic binder component (F) comprises cement and/or lime, including hydrated lime and quicklime, and may optionally comprise aggregates, fillers and other additives.

The cement may be a Portland cement, a calcium aluminate cement, a magnesium phosphate cement, a magnesium potassium phosphate cement, a calcium sulfoaluminate cement or any other suitable hydraulic binder.

Aggregates, inert fillers and/or admixtures may optionally be included in the hydraulic binder. These optional components can alternatively also be added only on preparation of a mortar or concrete. Preferably, between 0 and 80% by weight, particularly preferably between 30 and 70% by weight, of aggregate and/or inert fillers and/or between 0 and 15% by weight of admixtures may be present or may be added during the cement preparation. These weight data are based on the total weight of the solids of the (anhydrous) hydraulic binder system.

The aggregates can be gravels, silica, quartz, sand, crushed marble, glass spheres, granite, limestone, calcite, feldspar, alluvial sands, any other durable aggregates, and mixtures thereof. Fillers, such as powders, for example based on quartz, limestone, barite or clay, in particular quartz sand, perlite, kieselguhr (diatomaceous earth), exfoliated mica (vermiculite) and foamed sand, can also be used.

Suitable admixtures are, for example, generally known accelerators, retarders, air entraining agents, defoamers, plasticizers, corrosion inhibitors, bonding agents, or mixtures thereof.

In one embodiment of the invention, the polyurethane/urea cementitious hybrid system comprise the multiple components in the multi-component composition.

According to an embodiment of the invention, the polyurethane/urea cementitious hybrid system comprising the multi-component composition according to the invention may further include other additives.

In certain embodiments of the invention, the other additives may be at least one selected from thixotropic agents, adhesion promoters, antioxidants, light stabilizers, UV stabilizer, surfactant, wetting agents, viscosity modifier, extenders, dispersants, anti-blocking agents, air release agents, anti-sagging agents, anti-setting agents, defoaming agent, matting agents, flattening agents, waxes, anti-mar additives, anti-scratch additives, fiber, polymer powder, mesh, chip, hollow spheres and inert resins.

For those skilled in the art, the above additives are commercially available. The above formulation additives, if any, are presented in an amount commonly used in the art.

In other embodiments of the invention, the polyurethane/urea cementitious hybrid system comprising the composition according to the invention may further include a coloring agent, including, but not limited to, organic pigment, organo-metallic pigment, mineral-based pigment, carbon pigments, titanium pigment, azo compound, quinacridone compound, phthalocyanine compound, cadmium pigment, chromium pigment, cobalt pigment, copper pigment, iron pigment, clay earth pigment, lead pigment, mercury pigment, titanium pigment, aluminum pigment, manganese pigment, ultramarine pigment, zinc pigment, arsenic pigment, tin pigment, iron oxide pigment, antimonypigment, barium pigment, a biological pigment, dye, photochromic, conductive and liquid crystal polymer pigment, piezochromic pigment, goniochromaticpigment, silver pigment, diketopyrrolo-pyrrole, benzimidazolone, isoindoline, isoindolinone, radio-opacifier and the like.

For those skilled in the art, the above coloring agents are commercially available. The above coloring agents, if any, are presented in an amount commonly used in the art.

The multi-component composition according to the present invention can be formulated by mixing the above components (A)-(F) together before application. Preferably, the above components are mixed in suitable proportions such that the content of the isocyanate component (A) is about 1-40 wt %, preferably about 5-35 wt %, the content of the polyol component (B) is about 1-25 wt %, preferably about 2-20 wt %, the content of water is about 1-15 wt %, preferably about 2-10 wt %, the content of the catalyst (D) is about 0.001-5 wt %, preferably about 0.001-3 wt %, the content of the acidic additive (E) is about 0.01-3 wt %, preferably about 0.02-1.5 wt %, and the content of the hydraulic binder (F) is about 10-70 wt %, preferably about 15-50 wt %, all based on the total weight of the multi-component composition.

For use, the isocyanate component (A) and the polyol component (B) are mixed with the addition of water (C), the catalyst (D) and the acidic additive (E), and then the hydraulic binder (F) to form the multi-component composition. Optionally additives such as pigments can also be added into the mixture. The acidic additive can also be mixed with the catalyst to block the catalyst, and then be added into the mixture of other components. The isocyanates react with the polyols to form polyurethane, with water to form urea, while the hydraulic binder reacts with water to cure. These reactions form inorganic network of hydraulic binders and organic network of polyurethanes and urea, resulting in a construction material, such as flooring or coating, with mutual benefits from both of the inorganic cement part and the polyurethane/urea resin part. The application temperature of the multi-component composition is about 5-40° C., preferably 10-35° C.

Upon the mixing of the components, the polyurethane reaction, urea reaction and cement hydration take place at once, and the multi-component composition begins to cure. The working time of such polyurethane/urea cementitious hybrid system is usually 15-25 minutes at room temperature and even shorter at temperature above 30° C., so workers should apply the hybrid system quickly before complete cure of the composition. Nevertheless, with the addition of the acidic additive specifically defined under component (E), the multi-component composition according to the present invention acquires extended working time while, at the same time, brings no adverse effect on the properties such as overnight cure and final hardness.

Without bonding to any theory, it is believed that the extended working time achieved by the present invention is resulted from the addition of the particularly defined acidic additives with the particularly defined use amount as specified above in the present description. Among the above specified acidic additives, certain additives may bring about better extending effect of the working time, which will be specifically described in the examples below.

In an embodiment of the invention, the multi-component composition may be several independent packages that can be mixed on the spot for application. The components can be mixed at various orders, depending on the packaging arrangement and the intended application.

The present invention further provides a process for preparing a flooring, waterproofing, screed, grouting, primer, wall paint, roofing or coating, comprising the steps of:
mixing the components (A)-(F) to form a mixture;
applying the mixture onto a substrate; and
curing the applied mixture to form a flooring, waterproofing, screed, grouting, primer, wall paint, roofing or coating on the substrate.

In another embodiment, the mixing step of the above process may also comprise the sub-steps of mixing the components (A)-(E) together, and then adding component (F) to form a mixture.

In a further embodiment, the mixing step of the above process may also comprise the sub-steps of:
(a) mixing the components (D), (E) and optionally part of (C) to form a mixture;
(b) mixing the components (A), (B), (C) or residual of (C) with mixture obtained in sub-step (a) to form a mixture;
(c) adding component (F) to mixture obtained in sub-step (b) to form a mixture.

The flooring, waterproofing, screed, grouting, primer, wall paint, roofing or coating obtained by the present invention has a high compression strength, which is at least 45 N/mm$^2$, preferably at least 50 N/mm$^2$, and more preferably at least 55 N/mm$^2$, and a tensile strength of at least 5 N/mm$^2$, preferably at least 7 N/mm$^2$, and more preferably at least 9 N/mm$^2$. Such flooring, waterproofing, screed, grouting, primer, wall paint, roofing or coating can be cured in less than 24 hours at a broad range of temperatures, and shows improved chemical, abrasion and impact resistance.

In one embodiment, the polyurethane/urea cementitious hybrid system is used as flooring. The multi-component composition and optional additives are mixed and applied to the floor to be surfaced. The hybrid system is left to harden sufficiently, preferably overnight. In a preferred embodiment, a second layer of the polyurethane/urea cementitious hybrid system is formed on top of the first polyurethane/urea cementitious hybrid system layer after 24 hours and left to cure overnight to form the flooring.

In one embodiment, the polyurethane/urea cementitious hybrid system is used as decorative flooring surfaces. The floor to be surfaced is firstly bonded with fragments of plastic or other materials such as stone or marble by means of any polymer, natural or synthetic, which have adhesive properties. The multi-component composition, together with optional additives such as pigments are used as a grouting mixture and applied over the bonded fragments. The hybrid system is left to harden sufficiently for surface-grinding to be carried out, although it is not essential to wait until curing is complete. It is convenient to allow the composition to harden overnight. The rather rough surface then obtained is ground flat and smooth using similar techniques to those employed for grinding and finishing conventional Terrazzo floors.

The present invention may also be employed for the surfacing of other areas, flat, curved or inclined, providing that the grouting composition is sufficiently viscous to remain on such areas while hardening occurs.

Embodiments

The following embodiments are used to illustrate the invention in more detail.

The 1st embodiment is a multi-component composition comprising:
(A) 1-40 wt % of at least one isocyanate component selected from the group consisting of n-hexylisocyanate, cyclohexylisocyanate, hexamethylene isocyanate, 2-ethyl hexylisocyanate, n-octyl isocyanate, deodecylisocyanate, stearylisocyanate, benzyl isocyanate, diphenylmethane 4,4'-diisocyanate, diphenylmethane 2,4'-diisocyanate, the mixtures of monomeric diphenylmethane diisocyanates with diphenylmethane diisocyanate homologs having a larger number of rings (polymer MDI), tetramethylene diisocyanate, hexamethylene diisocyanate (HDI), 2,2,4- and 2,4,4-trimethylhexamethylene diisocyanates, dicyclohexylmethane diisocyanates, 3-isocyanatomethyl-3,5,5-trimethylcyclohexyl isocyanate, xylylene diisocyanate, mixtures of hexamethylene diisocyanates with oligomeric or polymeric homologs of hexamethylene diisocyanate (polynuclear HDI), isophorone diisocyanate (IPDI), tolylene 2,4- or 2,6-diisocyanate (TDI), and mixtures thereof;
(B) 1-25 wt % of at least one polyol selected from the group consisting of castor oil, ethyleneglycol, 1,2-, 1,3-propanediol, 1,2-, 1,3-pentanediol, 1,10-decanediol, 1,2-, 1,3-, 1,4-dihydroxycyclohexane, diethylene glycol and triethylene glycol, dipropylene glycol and tripropylene glycol, 1,4-butanediol, 1,6-hexanediol and bis(2-hydroxyethyl)hydroquinone, 1,2,4-, 1,3,5-trihydroxycyclohexane, glycerol and trimethylolpropane and low molecular weight hydroxyl-comprising polyalkylene oxides based on ethylene oxide and/or 1,2-propylene oxide, hydroxyl-ended polyether, polyester or polycarbonate and mixtures thereof;
(C) 1-15 wt % of water;
(D) 0.001-5 wt % of catalyst selected from the group consisting of tin(II), dialkyltin(IV) or potassium salts of organic carboxylic acids having carbon atoms of from 1 to 18, bis(2-dimethylaminoethyl) ether, N,N,N,N,N-pentamethyldiethylenetriamine, N,N,N-triethylaminoethoxyethanol, N,N,N',N'-Tetrakis(2-hydroxyethyl) ethylenediamine, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene, diazabicyclononene, 2,2'-dimorpholinodiethylether, N,N,N'-trimethyl-N'-hydroxyethyl-bisaminoethylether, N,N,N'-trimethylaminoethyl-ethanolamine, N,N,N',N'-Tetrakis(2-hydroxypropyl)ethylenediamine, N,N-bis(3-dimethylaminopropyl)-N-isopropanolamine, and N-(3-dimethylaminopropyl)-N,N-diisopropanolamine, and mixtures thereof;
(E) 0.01-3 wt % of at least one acidic additive selected from the group consisting of compounds having the general formula of $R_1-(COOH)_n$ (I) or $R_1-COOCO-R_2$ (II) or $R_1-COOR_3$ (III) or $R_1-SO_3H$ (IV), wherein
$R_1$, $R_2$ and $R_3$ are independently from each other selected from the group consisting of $C_1-C_{30}$-alkyl, $C_2-C_{30}$-alkenyl, $C_3-C_{30}$-cyclolalkyl, $C_3-C_{30}$-heterocyclyl, $C_3-C_{30}$-heterocyclyl-$C_1-C_{30}$-alkyl, $C_6-C_{30}$-aryl, $C_6-C_{30}$-aryl-$C_1-C_{30}$-alkyl, $C_2-C_{30}$-heteroaryl, $C_2-C_{30}$-heteroaryl-$C_1-C_{30}$-alkyl, and $C_1-C_{30}$-alkoxy-$C_1-C_{30}$-alkyl, each of which radicals is optionally substituted by halogen, cyano, nitro, $C_1-C_6$-alkyl, oxo, acyl, or $C_3-C_6$-cycloalkyl, with the heteroatom being selected from N, O and S,
or
$R_1$ and $R_2$, or $R_1$ and $R_3$, together with the carbon and oxygen atoms attached thereto, form a saturated or unsaturated 5- to 10-membered hetero ring, the ring being optionally fused with phenyl, with $R_1$-$R_3$ being optionally replaced by heteroatoms selected from N, O and S, and being optionally substituted by halogen, cyano, nitro, $C_1-C_6$-alkyl, oxo, acyl, or $C_3-C_6$-cycloalkyl;
n is an integer of 1-3; and
(F) 10-70 wt % of hydraulic binder selected from the group consisting of Portland cement, calcium aluminate cement, magnesium phosphate cement, magnesium potassium phosphate cement, and calcium sulfoaluminate cement.

The $2^{nd}$ embodiment is a multi-component composition comprising:
(A) 1-40 wt % of at least one isocyanate component selected from the group consisting of n-hexylisocyanate, cyclohexylisocyanate, hexamethylene isocyanate, 2-ethyl hexylisocyanate, n-octyl isocyanate, deodecylisocyanate, stearylisocyanate, benzyl isocyanate, diphenylmethane 4,4'-diisocyanate, diphenylmethane 2,4'-diisocyanate, the mixtures of monomeric diphenylmethane diisocyanates with diphenylmethane diisocyanate homologs having a larger number of rings (polymer MDI), tetramethylene diisocyanate, hexamethylene diisocyanate (HDI), 2,2,4- and 2,4,4-trimethylhexamethylene diisocyanates, dicyclohexylmethane diisocyanates, 3-isocyanatomethyl-3,5,5-trimethylcyclohexyl isocyanate, xylylene diisocyanate, mixtures of hexamethylene diisocyanates with oligomeric or polymeric homologs of hexamethylene diisocyanate (polynuclear HDI), isophorone diisocyanate (IPDI), tolylene 2,4- or 2,6-diisocyanate (TDI), and mixtures thereof;
(B) 1-25 wt % of at least one organic isocyanate-reactive compound selected from the group consisting of castor oil, hydroxyl-ended polyether, polyester or polycarbonate, and mixtures thereof;
(C) 1-15 wt % of water;
(D) 0.001-5 wt % of catalyst selected from the group consisting of tin(II), dialkyltin(IV) or potassium salts of organic carboxylic acids having carbon atoms of from 1 to 18, bis(2-dimethylaminoethyl) ether, N,N,N,N,N-pentamethyldiethylenetriamine, N,N,N-triethylaminoethoxyethanol, N,N,N',N'-Tetrakis(2-hydroxyethyl) ethylenediamine, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene, diazabicyclononene, 2,2'-dimorpholinodiethylether, N,N,N'-trimethyl-N'-hydroxyethyl-bisaminoethylether, N,N,N'-trimethylaminoethyl-ethanolamine, N,N,N',N'-Tetrakis(2-hydroxypropyl)ethylenediamine, N,N-bis(3-dimethylaminopropyl)-N-isopropanolamine, and N-(3-dimethylaminopropyl)-N,N-diisopropanolamine and mixtures thereof;

(E) 0.01-3 wt % of at least one acidic additive selected from the group consisting of compounds having the general formula of $R_5$—C(O)—$CHR_4$—C(O)—$R_6$, wherein $R_4$ is selected from H and $C_1$-$C_8$-alkyl, $R_5$ and $R_6$ are independently from each other selected from $C_1$-$C_8$-alkyl and $C_1$-$C_8$-alkoxy, or $R_5$ and $R_4$, or $R_5$ and $R_6$, together with the carbon atoms attached, form a 5- to 8-membered ring or hetero ring, with the ring member optionally replaced by N or O, and the ring member optionally substituted by $C_1$-$C_6$-alkyl, cyano, amino, hydroxyl, or oxo group; and (F) 10-70 wt % of hydraulic binder selected from the group consisting of Portland cement, calcium aluminate cement, magnesium phosphate cement, magnesium potassium phosphate cement, and calcium sulfoaluminate cement.

The 3$^{rd}$ embodiment is a multi-component composition comprising:

(A) 5-35 wt % of at least one isocyanate component selected from the group consisting of n-hexylisocyanate, cyclohexylisocyanate, hexamethylene isocyanate, 2-ethyl hexylisocyanate, n-octyl isocyanate, deodecylisocyanate, stearylisocyanate, benzyl isocyanate, diphenylmethane 4,4'-diisocyanate, diphenylmethane 2,4'-diisocyanate, the mixtures of monomeric diphenylmethane diisocyanates with diphenylmethane diisocyanate homologs having a larger number of rings (polymer MDI), tetramethylene diisocyanate, hexamethylene diisocyanate (HDI), 2,2,4- and 2,4,4-trimethylhexamethylene diisocyanates, dicyclohexylmethane diisocyanates, 3-isocyanatomethyl-3,5,5-trimethylcyclohexyl isocyanate, xylylene diisocyanate, mixtures of hexamethylene diisocyanates with oligomeric or polymeric homologs of hexamethylene diisocyanate (polynuclear HDI), isophorone diisocyanate (IPDI), tolylene 2,4- or 2,6-diisocyanate (TDI), and mixtures thereof;

(B) 2-20 wt % of at least one organic isocyanate-reactive compound selected from the group consisting of castor oil, ethylene glycol, 1,2-, 1,3-propanediol, 1,2-, 1,3-pentanediol, 1,10-decanediol, 1,2-, 1,3-, 1,4-dihydroxycyclohexane, diethylene glycol and triethylene glycol, dipropylene glycol and tripropylene glycol, 1,4-butanediol, 1,6-hexanediol and bis(2-hydroxyethyl)hydroquinone, 1,2,4-, 1,3,5-trihydroxycyclohexane, glycerol and trimethylolpropane and low molecular weight hydroxyl-comprising polyalkylene oxides based on ethylene oxide and/or 1,2-propylene oxide, hydroxyl-ended polyether, polyester or polycarbonate and mixtures thereof;

(C) 2-10 wt % of water;

(D) 0.001-3 wt % of catalyst selected from the group consisting of tin(II), dialkyltin(IV) or potassium salts of acetic acid, octanoic acid, lauric acid, or maleic acid, bis(2-dimethylaminoethyl) ether, N,N,N,N,N-pentamethyldiethylenetriamine, N,N,N-triethylaminoethoxyethanol, N,N,N',N'-Tetrakis(2-hydroxyethyl)ethylenediamine, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene, diazabicyclononene, 2,2'-dimorpholinodiethylether, N,N,N'-trimethyl-N'-hydroxyethyl-bisaminoethylether, N,N,N'-trimethylaminoethyl-ethanolamine, N,N,N',N'-Tetrakis(2-hydroxypropyl)ethylenediamine, N,N-bis(3-dimethylaminopropyl)-N-isopropanolamine, and N-(3-dimethylaminopropyl)-N,N-diisopropanolamine, and mixtures thereof;

(E) 0.02-2.5 wt % of at least one acidic additive selected from the group consisting of compounds having the general formula of $R_1$—$(COOH)_n$ (I) or $R_1$—COOCO—$R_2$ (II) or $R_1$—$COOR_3$ (III) or $R_1$—$SO_3H$ (IV), wherein $R_1$, $R_2$ and $R_3$ are independently from each other selected from the group consisting of $C_1$-$C_{15}$-alkyl, $C_2$-$C_{15}$-alkenyl, $C_3$-$C_{15}$-cyclolalkyl, $C_3$-$C_{15}$-heterocyclyl, $C_3$-$C_{15}$-heterocyclyl-$C_1$-$C_{15}$-alkyl, $C_6$-$C_{15}$-aryl, $C_6$-$C_{15}$-aryl-$C_1$-$C_{15}$-alkyl, $C_2$-$C_{15}$-heteroaryl, $C_2$-$C_{15}$-heteroaryl-$C_1$-$C_{15}$-alkyl, and $C_1$-$C_{15}$-alkoxy-$C_1$-$C_{15}$-alkyl, each of which radicals is optionally substituted by halogen, cyano, nitro, $C_1$-$C_6$-alkyl, oxo, acyl, or $C_3$-$C_6$-cycloalkyl, with the heteroatom being selected from N, O and S, or $R_1$ and $R_2$, or $R_1$ and $R_3$, together with the carbon and oxygen atoms attached thereto, form a saturated or unsaturated 5- to 10-membered hetero ring, the ring being optionally fused with phenyl, with $R_1$-$R_3$ being optionally replaced by heteroatoms selected from N, O and S, and being optionally substituted by halogen, cyano, nitro, $C_1$-$C_6$-alkyl, oxo, acyl, or $C_3$-$C_6$-cycloalkyl; and n is an integer of 1-3; and (F) 15-50 wt % of hydraulic binder selected from the group consisting of Portland cement, calcium aluminate cement, magnesium phosphate cement, magnesium potassium phosphate cement, and calcium sulfoaluminate cement.

The 4$^{th}$ embodiment is a multi-component composition comprising:

(A) 10-35 wt % of at least one isocyanate component selected from the group consisting of n-hexylisocyanate, cyclohexylisocyanate, hexamethylene isocyanate, 2-ethyl hexyl isocyanate, n-octyl isocyanate, deodecylisocyanate, stearylisocyanate, benzyl isocyanate, diphenylmethane 4,4'-diisocyanate, diphenylmethane 2,4'-diisocyanate, the mixtures of monomeric diphenylmethane diisocyanates with diphenylmethane diisocyanate homologs having a larger number of rings (polymer MDI), tetramethylene diisocyanate, hexamethylene diisocyanate (HDI), 2,2,4- and 2,4,4-trimethylhexamethylene diisocyanates, dicyclohexylmethane diisocyanates, 3-isocyanatomethyl-3,5,5-trimethylcyclohexyl isocyanate, xylylene diisocyanate, mixtures of hexamethylene diisocyanates with oligomeric or polymeric homologs of hexamethylene diisocyanate (polynuclear HDI), isophorone diisocyanate (IPDI), tolylene 2,4- or 2,6-diisocyanate (TDI), and mixtures thereof;

(B) 2-20 wt % of at least one organic isocyanate-reactive compound selected from the group consisting of castor oil, ethylene glycol, 1,2-, 1,3-propanediol, 1,2-, 1,3-pentanediol, 1,10-decanediol, 1,2-, 1,3-, 1,4-dihydroxycyclohexane, diethylene glycol and triethylene glycol, dipropylene glycol and tripropylene glycol, 1,4-butanediol, 1,6-hexanediol and bis(2-hydroxyethyl)hydroquinone, 1,2,4-, 1,3,5-trihydroxycyclohexane, glycerol and trimethylolpropane and low molecular weight hydroxyl-comprising polyalkylene oxides based on ethylene oxide and/or 1,2-propylene oxide, hydroxyl-ended polyether, polyester or polycarbonate and mixtures thereof;

(C) 2-10 wt % of water;

(D) 0.001-2 wt % of catalyst selected from the group consisting of tin(II), dialkyltin(IV) or potassium salts of acetic acid, octanoic acid, lauric acid, or maleic acid, bis(2-dimethylaminoethyl) ether, N,N,N,N,N-pentamethyldiethylenetriamine, N,N,N-triethylaminoethoxyethanol, N,N,N',N'-Tetrakis(2-hydroxyethyl)ethylenediamine, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene, diazabicyclononene, 2,2'-dimorpholinodiethylether, N,N,N'-trimethyl-N'-hydroxyethyl-bisaminoethylether, N,N,N'-trimethylaminoethyl-ethanolamine, N,N,N',N'-Tetrakis(2-hydroxypropyl)ethylenediamine, N,N-bis(3-dimethylaminopropyl)-N-isopropanolamine, and N-(3-dimethylaminopropyl)-N,N-diisopropanolamine and mixtures thereof;

(E) 0.02-2 wt % of at least one acidic additive selected from the group consisting of compounds having the general formula of $R_1$—$(COOH)_n$ (I) or $R_1$—COOCO—$R_2$ (II) or $R_1$—$COOR_3$ (III) or $R_1$—$SO_3H$ (IV), wherein $R_1$, $R_2$ and $R_3$ are independently from each other selected from the group consisting of $C_1$-$C_{10}$-alkyl, $C_2$-$C_{10}$-alkenyl, $C_3$-$C_{10}$-cyclolalkyl, $C_3$-$C_{10}$-heterocyclyl, $C_3$-$C_{10}$-heterocyclyl-$C_1$-$C_{10}$-alkyl, $C_6$-$C_{10}$-aryl, $C_6$-$C_{10}$-aryl-$C_1$-$C_{10}$-alkyl, $C_2$-$C_{10}$-heteroaryl, $C_2$-$C_{10}$-heteroaryl-$C_1$-$C_{10}$-alkyl, and $C_1$-$C_{10}$-alkoxy-$C_1$-$C_{10}$-alkyl, each of which radicals is optionally substituted by halogen, cyano, nitro, $C_1$-$C_6$-alkyl, oxo, acyl, or $C_3$-$C_6$-cycloalkyl, with the heteroatom being selected from N, O and S, or $R_1$ and $R_2$, or $R_1$ and $R_3$, together with the carbon and oxygen atoms attached thereto, form a saturated or unsaturated 5- to 10-membered hetero ring, the ring being optionally fused with phenyl, with $R_1$-$R_3$ being optionally replaced by heteroatoms selected from N, O and S, and being optionally substituted by halogen, cyano, nitro, $C_1$-$C_6$-alkyl, oxo, acyl, or $C_3$-$C_6$-cycloalkyl; and n is an integer of 1-2; and (F) 10-70 wt % of hydraulic binder selected from the group consisting of Portland cement, calcium aluminate cement, magnesium phosphate cement, magnesium potassium phosphate cement, and calcium sulfoaluminate cement.

The $5^{th}$ embodiment is a multi-component composition comprising:

(A) 10-35 wt % of at least one isocyanate component selected from the group consisting of n-hexylisocyanate, cyclohexylisocyanate, hexamethylene isocyanate, 2-ethyl hexyl isocyanate, n-octyl isocyanate, deodecylisocyanate, stearylisocyanate, benzyl isocyanate, diphenylmethane 4,4'-diisocyanate, diphenylmethane 2,4'-diisocyanate, the mixtures of monomeric diphenylmethane diisocyanates with diphenylmethane diisocyanate homologs having a larger number of rings (polymer MDI), tetramethylene diisocyanate, hexamethylene diisocyanate (HDI), 2,2,4- and 2,4,4-trimethylhexamethylene diisocyanates, dicyclohexylmethane diisocyanates, 3-isocyanatomethyl-3,5,5-trimethylcyclohexyl isocyanate, xylylene diisocyanate, mixtures of hexamethylene diisocyanates with oligomeric or polymeric homologs of hexamethylene diisocyanate (polynuclear HDI), isophorone diisocyanate (IPDI), tolylene 2,4- or 2,6-diisocyanate (TDI), and mixtures thereof;

(B) 2-15 wt % of at least one organic isocyanate-reactive compound selected from the group consisting of castor oil, ethyleneglycol, 1,2-, 1,3-propanediol, 1,2-, 1,3-pentanediol, 1,10-decanediol, 1,2-, 1,3-, 1,4-dihydroxycyclohexane, diethylene glycol and triethylene glycol, dipropylene glycol and tripropylene glycol, 1,4-butanediol, 1,6-hexanediol and bis(2-hydroxyethyl)hydroquinone, 1,2,4-, 1,3,5-trihydroxycyclohexane, glycerol and trimethylolpropane and low molecular weight hydroxyl-comprising polyalkylene oxides based on ethylene oxide and/or 1,2-propylene oxide, hydroxyl-ended polyether, polyester or polycarbonate and mixtures thereof;

(C) 2-10 wt % of water;

(D) 0.001-3 wt % of catalyst selected from the group consisting of tin(II), dialkyltin(IV) or potassium salts of acetic acid, octanoic acid, lauric acid, or maleic acid, bis(2-dimethylaminoethyl) ether, N,N,N,N,N-pentamethyldiethylenetriamine, N,N,N-triethylaminoethoxyethanol, N,N,N',N'-Tetrakis(2-hydroxyethyl)ethylenediamine, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene, diazabicyclononene, 2,2'-dimorpholinodiethylether, N,N,N'-trimethyl-N'-hydroxyethyl-bisaminoethylether, N,N,N'-trimethylaminoethyl-ethanolamine, N,N,N',N'-Tetrakis(2-hydroxypropyl)ethylenediamine, N,N-bis(3-dimethylaminopropyl)-N-isopropanolamine, and N-(3-dimethylaminopropyl)-N,N-diisopropanolamine and mixtures thereof;

(E) 0.02-1.5 wt % of at least one acidic additive selected from the group consisting of compounds having the general formula of $R_1$—$(COOH)_n$ (I) or $R_1$—COOCO—$R_2$ (II) or $R_1$—$COOR_3$ (III) or $R_1$—$SO_3H$ (IV), wherein $R_1$, $R_2$ and $R_3$ are independently from each other selected from the group consisting of $C_1$-$C_{10}$-alkyl, $C_2$-$C_{10}$-alkenyl, $C_3$-$C_{10}$-cyclolalkyl, $C_3$-$C_{10}$-heterocyclyl, $C_3$-$C_{10}$-heterocyclyl-$C_1$-$C_{10}$-alkyl, $C_6$-$C_{10}$-aryl, $C_6$-$C_{10}$-aryl-$C_1$-$C_{10}$-alkyl, $C_2$-$C_{10}$-heteroaryl, $C_2$-$C_{10}$-heteroaryl-$C_1$-$C_{10}$-alkyl, and $C_1$-$C_{10}$-alkoxy-$C_1$-$C_{10}$-alkyl, each of which radicals is optionally substituted by halogen, cyano, nitro, $C_1$-$C_6$-alkyl, oxo, acyl, or $C_3$-$C_6$-cycloalkyl, with the heteroatom being selected from N, O and S, or $R_1$ and $R_2$, or $R_1$ and $R_3$, together with the carbon and oxygen atoms attached thereto, form a saturated or unsaturated 5- to 10-membered hetero ring, the ring being optionally fused with phenyl, with $R_1$-$R_3$ being optionally replaced by heteroatoms selected from N, O and S, and being optionally substituted by halogen, cyano, nitro, $C_1$-$C_6$-alkyl, oxo, acyl, or $C_3$-$C_6$-cycloalkyl; and n is an integer of 1-2; and (F) 10-65 wt % of hydraulic binder selected from the group consisting of Portland cement, calcium aluminate cement, magnesium phosphate cement, magnesium potassium phosphate cement, and calcium sulfoaluminate cement.

The 6$^{th}$ embodiment is a multi-component composition comprising:

(A) 10-35 wt % of at least one isocyanate component selected from the group consisting of n-hexylisocyanate, cyclohexylisocyanate, hexamethylene isocyanate, 2-ethyl hexylisocyanate, n-octyl isocyanate, deodecylisocyanate, stearylisocyanate, benzyl isocyanate, diphenylmethane 4,4'-diisocyanate, diphenylmethane 2,4'-diisocyanate, the mixtures of monomeric diphenylmethane diisocyanates with diphenylmethane diisocyanate homologs having a larger number of rings (polymer MDI), tetramethylene diisocyanate, hexamethylene diisocyanate (HDI), 2,2,4- and 2,4,4-trimethylhexamethylene diisocyanates, dicyclohexylmethane diisocyanates, 3-isocyanatomethyl-3,5,5-trimethylcyclohexyl isocyanate, xylylene diisocyanate, mixtures of hexamethylene diisocyanates with oligomeric or polymeric homologs of hexamethylene diisocyanate (polynuclear HDI), isophorone diisocyanate (IPDI), tolylene 2,4- or 2,6-diisocyanate (TDI), and mixtures thereof;

(B) 2-15 wt % of at least one organic isocyanate-reactive compound selected from the group consisting of castor oil, ethyleneglycol, 1,2-, 1,3-propanediol, 1,2-, 1,3-pentanediol, 1,10-decanediol, 1,2-, 1,3-, 1,4-dihydroxycyclohexane, diethylene glycol and triethylene glycol, dipropylene glycol and tripropylene glycol, 1,4-butanediol, 1,6-hexanediol and bis(2-hydroxyethyl)hydroquinone, 1,2,4-, 1,3,5-trihydroxycyclohexane, glycerol and trimethylolpropane and low molecular weight hydroxyl-comprising polyalkylene oxides based on ethylene oxide and/or 1,2-propylene oxide, hydroxyl-ended polyether, polyester or polycarbonate and mixtures thereof;

(C) 3-10 wt % of water;

(D) 0.001-3 wt % of catalyst selected from the group consisting of tin(II), dialkyltin(IV) or potassium salts of acetic acid, octanoic acid, lauric acid, or maleic acid, bis(2-dimethylaminoethyl) ether, N,N,N,N,N-pentamethyldiethylenetriamine, N,N,N-triethylaminoethoxyethanol, N,N,N',N'-Tetrakis(2-hydroxyethyl)ethylenediamine, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene, diazabicyclononene, 2,2'-dimorpholinodiethylether, N,N,N'-trimethyl-N'-hydroxyethyl-bisaminoethylether, N,N,N'-trimethylaminoethyl-ethanolamine, N,N,N',N'-Tetrakis(2-hydroxypropyl)ethylenediamine, N,N-bis(3-dimethylaminopropyl)-N-isopropanolamine, and N-(3-dimethylaminopropyl)-N,N-diisopropanolamine and mixtures thereof;

(E) 0.02-1.5 wt % of at least one acidic additive selected from the group consisting of compounds having the general formula of $R_1$—(COOH)$_n$ (I) or $R_1$—COOCO—$R_2$ (II) or $R_1$—COOR$_3$ (III) or $R_1$—SO$_3$H (IV), wherein $R_1$ and $R_2$ are independently from each other selected from the group consisting of $C_3$-$C_6$-alkyl, $C_3$-$C_6$-alkenyl, and $C_3$-$C_6$-cyclolalkyl, each of which radicals is optionally substituted by halogen, cyano, nitro, $C_1$-$C_6$-alkyl, oxo, or acetyl, $R_3$ is $C_1$-$C_6$-alkyl, and n is 1; and (F) 10-70 wt % of hydraulic binder selected from the group consisting of Portland cement, calcium aluminate cement, magnesium phosphate cement, magnesium potassium phosphate cement, and calcium sulfoaluminate cement.

The 7$^{th}$ embodiment is a multi-component composition comprising:

(A) 10-35 wt % of at least one isocyanate component selected from the group consisting of n-hexylisocyanate, cyclohexylisocyanate, hexamethylene isocyanate, 2-ethyl hexylisocyanate, n-octyl isocyanate, deodecylisocyanate, stearylisocyanate, benzyl isocyanate, diphenylmethane 4,4'-diisocyanate, diphenylmethane 2,4'-diisocyanate, the mixtures of monomeric diphenylmethane diisocyanates with diphenylmethane diisocyanate homologs having a larger number of rings (polymer MDI), tetramethylene diisocyanate, hexamethylene diisocyanate (HDI), 2,2,4- and 2,4,4-trimethylhexamethylene diisocyanates, dicyclohexylmethane diisocyanates, 3-isocyanatomethyl-3,5,5-trimethylcyclohexyl isocyanate, xylylene diisocyanate, mixtures of hexamethylene diisocyanates with oligomeric or polymeric homologs of hexamethylene diisocyanate (polynuclear HDI), isophorone diisocyanate (IPDI), tolylene 2,4- or 2,6-diisocyanate (TDI), and mixtures thereof;

(B) 2-15 wt % of at least one organic isocyanate-reactive compound selected from the group consisting of castor oil, ethyleneglycol, 1,2-, 1,3-propanediol, 1,2-, 1,3-pentanediol, 1,10-decanediol, 1,2-, 1,3-, 1,4-dihydroxycyclohexane, diethylene glycol and triethylene glycol, dipropylene glycol and tripropylene glycol, 1,4-butanediol, 1,6-hexanediol and bis(2-hydroxyethyl)hydroquinone, 1,2,4-, 1,3,5-trihydroxycyclohexane, glycerol and trimethylolpropane and low molecular weight hydroxyl-comprising polyalkylene oxides based on ethylene oxide and/or 1,2-propylene oxide, hydroxyl-ended polyether, polyester or polycarbonate and mixtures thereof;

(C) 3-10 wt % of water;

(D) 0.01-2 wt % of catalyst selected from the group consisting of tin(II), dialkyltin(IV) or alkali potassium salts of acetic acid, octanoic acid, lauric acid, or maleic acid, bis(2-dimethylaminoethyl) ether, N,N,N,N,N-pentamethyldiethylenetriamine, N,N,N-triethylaminoethoxyethanol, N,N,N',N'-Tetrakis(2-hydroxyethyl)ethylenediamine, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene, diazabicyclononene, 2,2'-dimorpholinodiethylether, N,N,N'-trimethyl-N'-hydroxyethyl-bisaminoethylether, N,N,N'-trimethylaminoethyl-ethanolamine, N,N,N',N'-Tetrakis(2-hydroxypropyl)ethylenediamine, N,N-bis (3-dimethylaminopropyl)-N-isopropanolamine, and N-(3-dimethylaminopropyl)-N,N-diisopropanolamine and mixtures thereof;

(E) 0.02-2 wt % of at least one acidic additive selected from the group consisting of compounds having the general formula of $R_5$—C(O)—$CHR_4$—C(O)—$R_6$, wherein $R_4$ is selected from H and $C_1$-$C_3$-alkyl, $R_5$ and Re are independently from each other selected from $C_1$-$C_3$-alkyl and $C_1$-$C_3$-alkoxy, or $R_5$ and $R_4$, or $R_5$ and $R_6$, together with the carbon atoms attached, form a 5- to 6-membered ring or hetero ring, with the ring member optionally replaced by N or O, and the ring member optionally substituted by $C_1$-$C_6$-alkyl, cyano, amino, hydroxyl, or oxo group; and (F) 15-60 wt % of hydraulic binder selected from the group consisting of Portland cement, calcium aluminate cement, magnesium phosphate cement, magnesium potassium phosphate cement, and calcium sulfoaluminate cement.

The 8$^{th}$ embodiment is a multi-component composition comprising:

(A) 10-35 wt % of at least one isocyanate component selected from the group consisting of n-hexylisocyanate, cyclohexylisocyanate, hexamethylene isocyanate, 2-ethyl hexylisocyanate, n-octyl isocyanate, deodecylisocyanate, stearylisocyanate, benzyl isocyanate, diphenylmethane 4,4'-diisocyanate, diphenylmethane 2,4'-diisocyanate, the mixtures of monomeric diphenylmethane diisocyanates with diphenylmethane diisocyanate homologs having a larger number of rings (polymer MDI), tetramethylene diisocyanate, hexamethylene diisocyanate (HDI), 2,2,4- and 2,4,4-trimethylhexamethylene diisocyanates, dicyclohexylmethane diisocyanates, 3-isocyanatomethyl-3,5,5-trimethylcyclohexyl isocyanate, xylylene diisocyanate, mixtures of hexamethylene diisocyanates with oligomeric or polymeric homologs of hexamethylene diisocyanate (polynuclear HDI), isophorone diisocyanate (IPDI), tolylene 2,4- or 2,6-diisocyanate (TDI), and mixtures thereof;

(B) 5-15 wt % of at least one organic isocyanate-reactive compound selected from the group consisting of castor oil, ethyleneglycol, 1,2-, 1,3-propanediol, 1,2-, 1,3-pentanediol, 1,10-decanediol, 1,2-, 1,3-, 1,4-dihydroxycyclohexane, diethylene glycol and triethylene glycol, dipropylene glycol and tripropylene glycol, 1,4-butanediol, 1,6-hexanediol and bis(2-hydroxyethyl)hydroquinone, 1,2,4-, 1,3,5-trihydroxycyclohexane, glycerol and trimethylolpropane and low molecular weight hydroxyl-comprising polyalkylene oxides based on ethylene oxide and/or 1,2-propylene oxide, hydroxyl-ended polyether, polyester or polycarbonate and mixtures thereof;

(C) 5-10 wt % of water;

(D) 0.05-2 wt % of catalyst selected from the group consisting of tin(II), dialkyltin(IV) or alkali potassium salts of acetic acid, octanoic acid, lauric acid, or maleic acid, bis(2-dimethylaminoethyl) ether, N,N,N,N,N-pentamethyldiethylenetriamine, N,N,N-triethylaminoethoxyethanol, N,N,N',N'-Tetrakis(2-hydroxyethyl) ethylenediamine, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene, diazabicyclononene, 2,2'-dimorpholinodiethylether, N,N,N'-trimethyl-N'-hydroxyethyl-bisaminoethylether, N,N,N'-trimethylaminoethyl-ethanolamine, N,N,N',N'-Tetrakis(2-hydroxypropyl)ethylenediamine, N,N-bis (3-dimethylaminopropyl)-N-isopropanolamine, and N-(3-dimethylaminopropyl)-N,N-diisopropanolamine and mixtures thereof;

(E) 0.02-3 wt % of at least one acidic additive selected from the group consisting of acrylic acid, methacrylic acid, oleic acid, succinic acid, sebacic acid, phosphoric acid, gluconic acid, 1,3-dimethylbarbituric acid, benzene sulfonic acid, acetic anhydride, propionic anhydride, acrylic anhydride, methacrylic anhydride, butyric anhydride, isobutyric anhydride, crotonic anhydride, valeric anhydride, hexanoic anhydride, isatoic anhydride, diglycolic anhydride, terepthalic anhydride, maleic anhydride, methyl 2-oxocyclopentanecarboxylate, 2-acetylcyclopentanone, 2-acetylcyclopentanone and 1,3-dimethylbarbituric acid and ε-caprolactone; and (F) 20-60 wt % of hydraulic binder selected from the group consisting of Portland cement, calcium aluminate cement, magnesium phosphate cement, magnesium potassium phosphate cement, and calcium sulfoaluminate cement.

The 9$^{th}$ embodiment is a multi-component composition comprising:

(A) 10-35 wt % of at least one isocyanate component selected from the group consisting of n-hexylisocyanate, cyclohexylisocyanate, hexamethylene isocyanate, 2-ethyl hexylisocyanate, n-octyl isocyanate, deodecylisocyanate, stearylisocyanate, benzyl isocyanate, diphenylmethane 4,4'-diisocyanate, diphenylmethane 2,4'-diisocyanate, the mixtures of monomeric diphenylmethane diisocyanates with diphenylmethane diisocyanate homologs having a larger number of rings (polymer MDI), tetramethylene diisocyanate, hexamethylene diisocyanate (HDI), 2,2,4- and 2,4,4-trimethylhexamethylene diisocyanates, dicyclohexylmethane diisocyanates, 3-isocyanatomethyl-3,5,5-trimethylcyclohexyl isocyanate, xylylene diisocyanate, mixtures of hexamethylene diisocyanates with oligomeric or polymeric homologs of hexamethylene diisocyanate (polynuclear HDI), isophorone diisocyanate (IPDI), tolylene 2,4- or 2,6-diisocyanate (TDI), and mixtures thereof;

(B) 5-15 wt % of at least one organic isocyanate-reactive compound selected from the group consisting of castor oil, ethyleneglycol, 1,2-, 1,3-propanediol, 1,2-, 1,3-pentanediol, 1,10-decanediol, 1,2-, 1,3-, 1,4-dihydroxycyclohexane, diethylene glycol and triethylene glycol, dipropylene glycol and tripropylene glycol, 1,4-butanediol, 1,6-hexanediol and bis(2-hydroxyethyl)hydroquinone, 1,2,4-, 1,3,5-trihydroxycyclohexane, glycerol and trimethylolpropane and low molecular weight hydroxyl-comprising polyalkylene oxides based on ethylene oxide and/or 1,2-propylene oxide, hydroxyl-ended polyether, polyester or polycarbonate and mixtures thereof;

(C) 5-10 wt % of water;

(D) 0.05-2 wt % of catalyst selected from the group consisting of tin(II), dialkyltin(IV) or alkali potassium salts of acetic acid, octanoic acid, lauric acid, or maleic acid, bis(2-dimethylaminoethyl) ether, N,N,N,N,N-pentamethyldiethylenetriamine, N,N,N-triethylaminoethoxyethanol, N,N,N',N'-Tetrakis(2-hydroxyethyl) ethylenediamine, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene, diazabicyclononene, 2,2'-dimorpholinodiethylether, N,N,N'-trimethyl-N'-hydroxyethyl-bisaminoethylether, N,N,N'-trimethylaminoethyl-ethanolamine, N,N,N',N'-Tetrakis(2-hydroxypropyl)ethylenediamine, N,N-bis(3-dimethylaminopropyl)-N-isopropanolamine, and N-(3-dimethylaminopropyl)-N,N-diisopropanolamine and mixtures thereof; (E) 0.02-2 wt % of at least one acidic additive selected from the group consisting of butyric anhydride, isobutyric anhydride, valeric anhydride, hexanoic anhydride, ε-caprolactone, methacrylic anhydride, methacrylic acid, isatoic anhydride, oleic acid, 2-acetyl butyrolactone, methyl 2-oxo cyclopentanecarboxylate, 2-acetyl cyclopentanone or 1,3-dimethylbarbituric acid; and (F) 30-60 wt % of hydraulic binder selected from the group consisting of Portland cement, calcium aluminate cement, magnesium phosphate cement, magnesium potassium phosphate cement, and calcium sulfoaluminate cement.

The 10$^{th}$ embodiment is a multi-component composition comprising:

(A) 15-35 wt % of at least one isocyanate component selected from the group consisting of n-hexylisocyanate, cyclohexylisocyanate, hexamethylene isocyanate, 2-ethyl hexylisocyanate, n-octyl isocyanate, deodecylisocyanate, stearylisocyanate, benzyl isocyanate, diphenylmethane 4,4'-diisocyanate, diphenylmethane 2,4'-diisocyanate, the mixtures of monomeric diphenylmethane diisocyanates with diphenylmethane diisocyanate homologs having a larger number of rings (polymer MDI), tetramethylene diisocyanate, hexamethylene diisocyanate (HDI), 2,2,4- and 2,4,4-trimethylhexamethylene diisocyanates, dicyclohexylmethane diisocyanates, 3-isocyanatomethyl-3,5,5-trimethylcyclohexyl isocyanate, xylylene diisocyanate, mixtures of hexamethylene diisocyanates with oligomeric or polymeric homologs of hexamethylene diisocyanate (polynuclear HDI), isophorone diisocyanate (IPDI), tolylene 2,4- or 2,6-diisocyanate (TDI), and mixtures thereof;

(B) 5-15 wt % of at least one organic isocyanate-reactive compound selected from the group consisting of castor oil, ethyleneglycol, 1,2-, 1,3-propanediol, 1,2-, 1,3-pentanediol, 1,10-decanediol, 1,2-, 1,3-, 1,4-dihydroxycyclohexane, diethylene glycol and triethylene glycol, dipropylene glycol and tripropylene glycol, 1,4-butanediol, 1,6-hexanediol and bis(2-hydroxyethyl)hydroquinone, 1,2,4-, 1,3,5-trihydroxycyclohexane, glycerol and trimethylolpropane and low molecular weight hydroxyl-comprising polyalkylene oxides based on ethylene oxide and/or 1,2-propylene oxide, hydroxyl-ended polyether, polyester or polycarbonate and mixtures thereof;

(C) 5-10 wt % of water;

(D) 0.01-2 wt % of catalyst selected from the group consisting of tin(II), dialkyltin(IV) or alkali potassium salts of acetic acid, octanoic acid, lauric acid, or maleic acid, bis(2-dimethylaminoethyl) ether, N,N,N,N,N-pentamethyldiethylenetriamine, N,N,N-triethylaminoethoxyethanol, N,N,N',N'-Tetrakis(2-hydroxyethyl) ethylenediamine, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene, diazabicyclononene, 2,2'-dimorpholinodiethylether, N,N,N'-trimethyl-N'-hydroxyethyl-bisaminoethylether, N,N,N'-trimethylaminoethyl-ethanolamine, N,N,N',N'-Tetrakis(2-hydroxypropyl)ethylenediamine, N,N-bis(3-dimethylaminopropyl)-N-isopropanolamine, and N-(3-dimethylaminopropyl)-N,N-diisopropanolamine and mixtures thereof; (E) 0.02-1.5 wt % of at least one acidic additive selected from the group consisting of butyric anhydride, isobutyric anhydride, valeric anhydride, hexanoic anhydride, ε-caprolactone, methacrylic anhydride, methacrylic acid, isatoic anhydride, oleic acid, 1,3-dimethylbarbituric acid, 2-acetylcyclopentanone, methyl 2-oxo cyclopentanecarboxylate, and 2-acetylbutyrolactone; and (F) 30-60 wt % of hydraulic binder selected from the group consisting of Portland cement, calcium aluminate cement, magnesium phosphate cement, magnesium potassium phosphate cement, and calcium sulfoaluminate cement.

The 11$^{th}$ embodiment is a multi-component composition comprising:

(A) 15-35 wt % of at least one isocyanate component selected from the group consisting of n-hexylisocyanate, cyclohexylisocyanate, hexamethylene isocyanate, 2-ethyl hexylisocyanate, n-octyl isocyanate, deodecylisocyanate, stearylisocyanate, benzyl isocyanate, diphenylmethane 4,4'-diisocyanate, diphenylmethane 2,4'-diisocyanate, the mixtures of monomeric diphenylmethane diisocyanates with diphenylmethane diisocyanate homologs having a larger number of rings (polymer MDI), tetramethylene diisocyanate, hexamethylene diisocyanate (HDI), 2,2,4- and 2,4,4-trimethylhexamethylene diisocyanates, dicyclohexylmethane diisocyanates, 3-isocyanatomethyl-3,5,5-trimethylcyclohexyl isocyanate, xylylene diisocyanate, mixtures of hexamethylene diisocyanates with oligomeric or polymeric homologs of hexamethylene diisocyanate (polynuclear HDI), isophorone diisocyanate (IPDI), tolylene 2,4- or 2,6-diisocyanate (TDI), and mixtures thereof;

(B) 5-15 wt % of at least one organic isocyanate-reactive compound selected from the group consisting of castor oil, ethylene glycol, 1,2-, 1,3-propanediol, 1,2-, 1,3-pentanediol, 1,10-decanediol, 1,2-, 1,3-, 1,4-dihydroxycyclohexane, diethylene glycol and triethylene glycol, dipropylene glycol and tripropylene glycol, 1,4-butanediol, 1,6-hexanediol and bis(2-hydroxyethyl)hydroquinone, 1,2,4-, 1,3,5-trihydroxycyclohexane, glycerol and trimethylolpropane and low molecular weight hydroxyl-comprising polyalkylene oxides based on ethylene oxide and/or 1,2-propylene oxide, hydroxyl-ended polyether, polyester or polycarbonate and mixtures thereof;

(C) 5-10 wt % of water;

(D) 0.01-2 wt % of catalyst selected from the group consisting of tin(II), dialkyltin(IV) or alkali potassium salts of acetic acid, octanoic acid, lauric acid, or maleic acid, bis(2-dimethylaminoethyl) ether, N,N,N,N,N-pentamethyldiethylenetriamine, N,N,N-triethylaminoethoxyethanol, N,N,N',N'-Tetrakis(2-hydroxyethyl) ethylenediamine, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene, diazabicyclononene, 2,2'-dimorpholinodiethylether, N,N,N'-trimethyl-N'-hydroxyethyl-bisaminoethylether, N,N,N'-trimethylaminoethyl-ethanolamine, N,N,N',N'-Tetrakis(2-hydroxypropyl)ethylenediamine, N,N-bis (3-dimethylaminopropyl)-N-isopropanolamine, and N-(3-dimethylaminopropyl)-N,N-diisopropanolamine and mixtures thereof;
- (E) 0.02-1 wt % of at least one acidic additive selected from the group consisting of methacrylic acid and oleic acid; and
- (F) 20-60 wt % of hydraulic binder selected from the group consisting of Portland cement, calcium aluminate cement, magnesium phosphate cement, magnesium potassium phosphate cement, and calcium sulfoaluminate cement.

The 12$^{th}$ embodiment is a multi-component composition comprising:
- (A) 20-35 wt % of at least one isocyanate component selected from the group consisting of diphenylmethane 4,4'-diisocyanate, diphenylmethane 2,4'-diisocyanate, the mixtures of monomeric diphenylmethane diisocyanates with diphenylmethane diisocyanate homologs having a larger number of rings (polymer MDI), tolylene 2,4- or 2,6-diisocyanate (TDI), and mixtures thereof;
- (B) 5-15 wt % of at least one organic isocyanate-reactive compound selected from the group consisting of castor oil, dihydric or trihydric polyether having an equivalent weight of from about 100 to about 1500, dihydric or trihydric polycarbonate having a number average molecular weight of about 400 to about 15000 and mixtures thereof;
- (C) 5-10 wt % of water;
- (D) 0.01-2 wt % of catalyst selected from the group consisting of tin(II) acetate, tin(II) octoate, tin(II) ethylhexanoate and tin(II) laurate, N,N,N',N'-Tetrakis (hydroxyethyl) ethylenediamine, and mixtures thereof;
- (E) 0.02-1 wt % of at least one acidic additive selected from the group consisting of butyric anhydride, isobutyric anhydride, valeric anhydride, hexanoic anhydride, ε-caprolactone, methacrylic anhydride, methacrylic acid, isatoic anhydride, oleic acid, 2-acetyl butyrolactone and methyl 2-oxo cyclopentanecarboxylate; and
- (F) 20-60 wt % of Portland cement.

The 13$^{th}$ embodiment is a multi-component composition comprising:
- (A) 20-35 wt % of at least one isocyanate component selected from the group consisting of diphenylmethane 4,4'-diisocyanate, diphenylmethane 2,4'-diisocyanate, the mixtures of monomeric diphenylmethane diisocyanates with diphenylmethane diisocyanate homologs having a larger number of rings (polymer MDI), tolylene 2,4- or 2,6-diisocyanate (TDI), and mixtures thereof;
- (B) 5-15 wt % of at least one organic isocyanate-reactive compound selected from the group consisting of castor oil, dihydric or trihydric polyether having an equivalent weight of from about 100 to about 1500, dihydric or trihydric polycarbonate having a number average molecular weight of about 400 to about 15000 and mixtures thereof;
- (C) 5-10 wt % of water;
- (D) 0.05-2 wt % of catalyst selected from the group consisting of tin(II) acetate, tin(II) octoate, tin(II) ethylhexanoate and tin(II) laurate, N,N,N',N'-Tetrakis (hydroxyethyl) ethylenediamine, and mixtures thereof;
- (E) 0.02-1 wt % of at least one acidic additive selected from the group consisting of 2-acetyl cyclopentanone or 1,3-dimethylbarbituric acid; and
- (F) 20-60 wt % of Portland cement.

The 14th embodiment is a polyurethane/urea cementitious hybrid comprising the composition according to any one of embodiments 1-13 which further comprises one or more additives selected from the group consisting of thixotropic agents, adhesion promoters, antioxidants, light stabilizers, UV stabilizer, surfactant, wetting agents, viscosity modifier, extenders, dispersants, anti-blocking agents, air release agents, anti-sagging agents, anti-setting agents, defoaming agent, matting agents, coloring agents, flattening agents, waxes, anti-mar additives, anti-scratch additives, fiber, polymer powder, mesh, chip, hollow spheres and inert resins.

The 15th embodiment is a polyurethane/urea cementitious hybrid comprising the composition according to any one of embodiments 1-13 which further comprises one or more additives selected from the group consisting of thixotropic agents, surfactant, UV stabilizer, and defoaming agent.

The 16th embodiment is a polyurethane/urea cementitious hybrid comprising the composition according to any one of embodiments 1-13 which further comprises one or more additives selected from the group consisting of antioxidants, light stabilizers, UV stabilizers and coloring agents.

The 17th embodiment is a polyurethane/urea cementitious hybrid comprising the composition according to any one of embodiments 1-13 which further comprises one or more additives selected from the group consisting of light stabilizers, coloring agents, air release agents and viscosity modifier.

EXAMPLE

The present invention will now be described with reference to Examples and Comparative Examples, which are not intended to limit the present invention.

The following starting materials were used:
Portland cement 42.5, quartz sand (30-200 BS sieve size);
Isocyanate: Lupranat® Ml (mixture of 2,4'-MDI and 4,4'-MDI, commercially available from BASF SE);
Polyol: Castor oil;
Water;
Amine catalyst: N,N,N',N'-Tetrakis(hydroxyethyl)ethylenediamine.

Application process was fixed as follows: Mix all the liquid components (isocyanate, polyol, water and catalyst) at 600 rpm for 1 min, then add solid components (filler, Portland cement and quartz sand) and mix continuously for another 2.5 min. The mixing equipment is selected from cement mixer for a large batch of materials, and IKA mechanical mixer for a small batch of materials.

Measurement Methods
Working time: The working time was determined according to the following method: The components (A)-(F) are mixed, and the material obtained is then poured onto a test surface within a mold and form a layer with thickness of about 4 mm. The time measurement is started immediately after the mixing of liquid and solid components. After selected time intervals, eg. 1-2 minutes, a roller with spikes is applied, and several marks are scratched into the screed in the full depth of the applied material and the healing of the surface was investigated. At first, the marks will disappear readily when the material still has good flowability. After a certain period of time, the marks in the screed will become more and more visible, until eventually there is no re-joining of the edges, which are formed by the scratched marks. At the specific time where a visible mark remains, even though the edges have joined, the time is recorded as the working time.

Shore D hardness: The Shore D hardness at 16 and 24 hours after the mixing step were determined according to ASTM D 2240.

a. Working Time Extension of the Inventive Compositions

Comparative Example 1

30 parts of Lupranat® Ml, 10 parts of castor oil, 9.91 parts of water and 0.09 parts of N,N,N',N'-Tetrakis (hydroxyethyl) ethylenediamine were mixed together for 1 min until the mixture became homogenous. Then, 25 parts of Portland cement and 25 parts of quartz sand were added and mixed uniformly for another 2.5 min.

Various comparative and inventive compositions were prepared according to the procedure stated above for Comparative Example 1, except that the content of the catalyst, the type of the acidic additives and the contents thereof were altered as shown in the following Table 1.

At the temperature of 20° C. and a humidity of 35%, each of the above mixtures prepared was individually applied onto a substrate as a layer with thickness of 4 mm and left undisturbed for curing. The working time and shore D hardness were tested in the same environment according to the methods stated above. The results were summarized in the following Table 1:

TABLE 1

| Examples | Content of catalyst (wt %) | Acidic additive | Content of acidic additive (wt %) | Working time (min) | Increase of working time in relative to Comparative Example 1 (min) | Shore D hardness after 24 h |
|---|---|---|---|---|---|---|
| Comparative Example 1 | 0.09 | — | — | 24 | — | 74.9 |
| Comparative Example 2 | 0.025 | — | — | 28 | +4 | 64.6 |
| Inventive Example 1 | 0.09 | succinic acid | 0.1 | 26 | +2 | 72.1 |
| Inventive Example 2 | 0.09 | benzene sulfonic acid | 0.1 | 27 | +3 | 73.5 |
| Inventive Example 3 | 0.09 | oleic acid | 0.05 | 33 | +9 | 74.0 |
| Inventive Example 4 | 0.09 | citric acid | 0.2 | 25 | +2 | 71.5 |
| Inventive Example 5 | 0.09 | phosphoric acid | 0.1 | 26 | +2 | 71.9 |
| Inventive Example 6 | 0.09 | methacrylic acid | 0.1 | 29 | +5 | 73.8 |
| Inventive Example 7 | 0.09 | methacrylic acid | 0.2 | 30 | +6 | 74.6 |
| Inventive Example 8 | 0.09 | gluconic acid | 0.1 | 25 | +2 | 72.1 |
| Inventive Example 9 | 0.09 | 1,3-dimethylbarbituric acid | 0.2 | 28 | +4 | 72.6 |
| Inventive Example 10 | 0.09 | 1,3-dimethylbarbituric acid | 0.5 | 30 | +6 | 72.9 |
| Inventive Example 11 | 0.09 | acetic anhydride | 0.5 | 26 | +2 | 71.8 |
| Inventive Example 12 | 0.09 | propionic anhydride | 0.5 | 26 | +2 | 72.0 |
| Inventive Example 13 | 0.09 | butyric anhydride | 0.5 | 33 | +9 | 75.0 |
| Inventive Example 14 | 0.09 | butyric anhydride | 1.0 | 41 | +17 | 75.8 |
| Inventive Example 15 | 0.09 | isobutyric anhydride | 0.5 | 30 | +6 | 74.9 |
| Inventive Example 16 | 0.09 | isobutyric anhydride | 1.0 | 38 | +14 | 75.2 |
| Inventive Example 17 | 0.09 | valeric anhydride | 0.5 | 37 | +13 | 75.8 |
| Inventive Example 18 | 0.09 | valeric anhydride | 1.0 | 38 | +14 | 76.0 |
| Inventive Example 19 | 0.09 | hexanoic anhydride | 0.5 | 31 | +7 | 74.9 |
| Inventive Example 20 | 0.09 | cratonic anhydride | 0.5 | 26 | +2 | 75.6 |
| Inventive Example 21 | 0.09 | methacrylic anhydride | 0.1 | 27 | +3 | 75.4 |

TABLE 1-continued

| Examples | Content of catalyst (wt %) | Acidic additive | Content of acidic additive (wt %) | Working time (min) | Increase of working time in relative to Comparative Example 1 (min) | Shore D hardness after 24 h |
|---|---|---|---|---|---|---|
| Inventive Example 22 | 0.09 | methacrylic anhydride | 0.2 | 28 | +4 | 75.9 |
| Inventive Example 23 | 0.09 | methacrylic anhydride | 0.5 | 29 | +5 | 76.0 |
| Inventive Example 24 | 0.09 | isatoic anhydride | 0.1 | 27 | +3 | 74.2 |
| Inventive Example 25 | 0.09 | isatoic anhydride | 0.5 | 32 | +8 | 74.6 |
| Inventive Example 26 | 0.09 | isatoic anhydride | 1.0 | 34 | +10 | 74.6 |
| Inventive Example 27 | 0.09 | pivalic anhydride | 0.5 | 31 | +7 | 75.2 |
| Inventive Example 28 | 0.09 | pivalic anhydride | 1.0 | 34 | +10 | 75.8 |
| Inventive Example 29 | 0.09 | ε-caprolactone | 1.0 | 31 | +7 | 74.2 |
| Inventive Example 30 | 0.09 | 2-acetyl butyrolactone | 1.0 | 39 | +15 | 75.2 |
| Inventive Example 31 | 0.09 | methyl 2-oxo cyclopentane carboxylate | 1.0 | 34 | +10 | 73.8 |
| Inventive Example 32 | 0.09 | 2-acetyl cyclopentanone | 1.0 | 34 | +10 | 76.5 |
| Inventive Example 33 | 0.09 | Na$_2$HPO$_4$/citric acid (pH = 3) | * | 26 | +2 | 71.9 |

*9.91 parts of Na$_2$HPO$_4$/citric acid (pH = 3) buffering solution was added instead of water (C) in the preparation procedure.

As compared with Comparative Example 1 containing 0.09% of catalyst, when the content of the catalyst was reduced to 0.025% in Comparative Example 2, the working time was extended by 4 minutes; however, Shore D hardness after 24 hours decreased significantly. In contrast, in the Inventive Examples, for example, Inventive Example 16, by further addition of 0.5 wt % butyric anhydride as the acidic additive, the working time was extended by 9 minutes (i.e. by 38%), while the Shore D hardness after 24 hours were almost unaffected.

As also can be seen from the Table 1, the Inventive Examples comprising various acidic additives according to the invention all showed extended working time and comparable Shore D hardness after curing. Particularly, among the various acidic additives tested, carboxylic anhydrides or lactones with the alkyl group attached to the carboxyl group containing 3-6 carbon atoms showed better extending effect of the working time.

b. Effect of the Contents of the Acidic Additives

In this part, the inventors tested the effect of the contents of the acidic additives in the compositions. Various compositions were prepared according to the procedure of the above inventive examples, except that the contents of the acidic additives were altered as shown in the following Table 2. The working time and shore D hardness were tested according to the methods stated above. The results were summarized in the following Table 2:

TABLE 2

| Examples | Acidic additive (by weight) | Working time (min) | Increase of the working time in relative to comparative example 1 (min) (min) | Shore D hardness after 16 h | Shore D hardness after 24 h |
|---|---|---|---|---|---|
| Inventive Example 34 | 2% methacrylic anhydride | 36 | +12 | 69.4 | 78.3 |
| Inventive Example 35 | 3% methacrylic anhydride | 29 | +5 | 70.3 | 79.2 |
| Comparative Example 3 | 4% methacrylic anhydride | 20 | −4 | 68.4 | 77.7 |
| Comparative Example 4 | 3.3% methacrylic acid | 19 | −8 | 69.1 | 74.5 |

It can be seen from the Table 2 that, the content of the acidic additive should be controlled within the range of 0.01-3 wt %, based on the total weight of the composition. If the amount of the acidic additive exceeded 3 wt %, for example 3.3 wt % or 4 wt % in Comparative Example 3-4, the working time was even shortened, which means the reaction or the curing of the composition was even accelerated.

c. Performance at High Temperature

In this part, the performance of the inventive compositions at high temperature was tested. It is known that the working window under such condition is even narrower than that at room temperature. The comparative composition (as reference) and inventive compositions were prepared according to Comparative Example 1 and inventive compositions respectively, except that the acidic additive added in the inventive compositions is 0.5% of 1,3-dimethylbarbituric acid (DMBA) or 0.5% of DMBA+1% ε-caprolactone, and the application and testing were performed at the temperature of ° C. and a humidity of 40%. The results were summarized as follows:

TABLE 3

| Examples | Acidic additive | Working time (min) | Increase of working time (min) | Shore D hardness after 24 h |
|---|---|---|---|---|
| Comparative Example 5 | — | 16 | — | 73.2 |
| Inventive Example 36 | 0.5% DMBA | 20 | +4 | 74.7 |
| Inventive Example 37 | 0.5% DMBA + 1% ε-caprolactone | 22 | +6 | 74.3 |

It can be seen from the Table 3 that, even under higher temperature and higher humidity, the inventive compositions still achieved substantially extended working time and comparable Shore D hardness. Such high performance at high temperature proves that the inventive composition can be suitably used under broad application conditions.

The structures, materials, compositions, and methods described herein are intended to be representative examples of the invention, and it will be understood that the scope of the invention is not limited by the scope of the examples. Those skilled in the art will recognize that the invention may be practiced with variations on the disclosed structures, materials, compositions, and methods, and such variations are regarded as within the ambit of the invention. Thus, it is intended that the present invention cover such modifications and variations as come within the scope of the appended claims and their equivalents.

The invention claimed is:

1. A multi-component composition comprising:
(A) at least one isocyanate component selected from the group consisting of monoisocyanate, polyisocyanate and NCO terminated prepolymer;
(B) at least one organic isocyanate-reactive compound selected from the group consisting of polyol, polyamide, polyamine, and polyesteramide;
(C) water;
(D) catalyst;
(E) at least one acidic additive that is selected from diketones and compounds having the general formula (II):

$$R_1\text{—COOCO—}R_2 \qquad (II)$$

wherein
$R_1$ and $R_2$ are independently from each other selected from the group consisting of $C_1$-$C_{30}$-alkyl, $C_2$-$C_{30}$-alkenyl, $C_3$-$C_{30}$-cyclolalkyl, $C_3$-$C_{30}$-heterocyclyl, $C_3$-$C_{30}$-heterocyclyl-$C_1$-$C_{30}$-alkyl, $C_6$-$C_{30}$-aryl, $C_6$-$C_{30}$-aryl-$C_1$-$C_{30}$-alkyl, $C_2$-$C_{30}$-heteroaryl, $C_2$-$C_{30}$-heteroaryl-$C_1$-$C_{30}$-alkyl, and $C_1$-$C_{30}$-alkoxy-$C_1$-$C_{30}$-alkyl, each of which radicals is optionally substituted by halogen, cyano, nitro, $C_1$-$C_6$-alkyl, oxo, acyl, or $C_3$-$C_6$-cycloalkyl, with the heteroatom being selected from N, O and S,
or
$R_1$ and $R_2$, together with the carbon and oxygen atoms attached thereto, form a saturated or unsaturated 5- to 10-membered hetero ring, the ring being optionally fused with phenyl, with $R_1$ and $R_2$ being optionally replaced by heteroatoms selected from N, O and S, and being optionally substituted by halogen, cyano, nitro, $C_1$-$C_6$-alkyl, oxo, acyl, or $C_3$-$C_6$-cycloalkyl; and
(F) hydraulic binder;
wherein the at least one acidic additive is present in an amount of 0.01 to 3 wt % based on the total weight of the composition.

2. The multi-component composition according to claim 1, wherein component (A) is selected from the group consisting of n-hexylisocyanate, cyclohexylisocyanate, hexamethylene isocyanate, 2-ethyl hexylisocyanate, n-octyl isocyanate, dodecyl-isocyanate, stearylisocyanate, benzyl isocyanate, diphenylmethane 4,4'-diisocyanate, diphenylmethane 2,4'-diisocyanate, the mixtures of monomeric diphenylmethane diisocyanates with diphenylmethane diisocyanate homologs having a larger number of rings (polymer MDI), tetramethylene diisocyanate, hexamethylene diisocyanate (HDI), mixtures of hexamethylene diisocyanates with oligomeric or polymeric homologs of hexamethylene diisocyanate (polynuclear HDI), isophorone diisocyanate (IPDI), tolylene 2,4- or 2,6-diisocyanate (TDI), and mixtures of two or more of these isocyanates.

3. The multi-component composition according to claim 1, wherein component (B) is selected from the group consisting of polyhydric polyols, aminoalcohols, polyether polyols, polyester polyols, polycarbonate polyols and mixtures thereof.

4. The multi-component composition according to claim 1, wherein catalyst (D) is selected from the group consisting of amine-based catalysts, catalysts based on organic metal compounds, and combinations thereof.

5. The multi-component composition according to claim 1, wherein the acidic additive is selected from compounds having the general formula (II):

$$R_1\text{—COOCO—}R_2 \qquad (II)$$

wherein
$R_1$ and $R_2$ are independently from each other selected from the group consisting of $C_1$-$C_{30}$-alkyl, $C_2$-$C_{30}$-alkenyl, $C_3$-$C_{30}$-cyclolalkyl, $C_3$-$C_{30}$-heterocyclyl, $C_3$-$C_{30}$-heterocyclyl-$C_1$-$C_{30}$-alkyl, $C_6$-$C_{30}$-aryl, $C_6$-$C_{30}$-aryl-$C_1$-$C_{30}$-alkyl, $C_2$-$C_{30}$-heteroaryl, $C_2$-$C_{30}$-heteroaryl-$C_1$-$C_{30}$-alkyl, and $C_1$-$C_{30}$-alkoxy-$C_1$-$C_{30}$-alkyl, each of which radicals is optionally substituted by halogen, cyano, nitro, $C_1$-$C_6$-alkyl, oxo, acyl, or $C_3$-$C_6$-cycloalkyl, with the heteroatom being selected from N, O and S,
or
$R_1$ and $R_2$, together with the carbon and oxygen atoms attached thereto, form a saturated or unsaturated 5- to 10-membered hetero ring, the ring being optionally fused with phenyl, with $R_1$ and $R_2$ being optionally replaced by heteroatoms selected from N, O and S, and being optionally substituted by halogen, cyano, nitro, $C_1$-$C_6$-alkyl, oxo, acyl, or $C_3$-$C_6$-cycloalkyl.

6. The multi-component composition according to claim 5, wherein the acidic additive is selected from compounds having the general formula (II):

$$R_1\text{—COOCO—}R_2 \qquad (II)$$

wherein $R_1$ and $R_2$ are independently from each other selected from the group consisting of $C_1$-$C_{15}$-alkyl, $C_2$-$C_{15}$-alkenyl, $C_3$-$C_{15}$-cyclolalkyl, $C_3$-$C_{15}$-heterocyclyl, $C_3$-$C_{15}$-heterocyclyl-$C_1$-$C_{15}$-alkyl, $C_6$-$C_{15}$-aryl, $C_6$-$C_{15}$-aryl-$C_1$-$C_{15}$-alkyl, $C_2$-$C_{15}$-heteroaryl, $C_2$-$C_{15}$-heteroaryl-$C_1$-$C_{15}$-alkyl, and $C_1$-$C_{15}$-alkoxy-$C_1$-$C_{15}$-alkyl, each of which radicals is optionally substituted by halogen, cyano, nitro, $C_1$-$C_6$-alkyl, oxo, acyl, or $C_3$-$C_6$-cycloalkyl, with the heteroatom being selected from N, O and S, or $R_1$ and $R_2$, together with the carbon and oxygen atoms attached thereto, form a saturated or unsaturated 5- to 10-membered hetero ring, the ring being optionally fused with phenyl, with $R_1$ and $R_2$ being optionally replaced by heteroatoms selected from N, O and S, and being optionally substituted by halogen, cyano, nitro, $C_1$-$C_6$-alkyl, oxo, acyl, or $C_3$-$C_6$-cycloalkyl.

7. The multi-component composition according to claim 6, wherein the acidic additive is selected from compounds having the general formula (II):

$$R_1\text{—COOCO—}R_2 \qquad (II)$$

wherein $R_1$ and $R_2$ are independently from each other selected from the group consisting of $C_1$-$C_{10}$-alkyl, $C_2$-$C_{10}$-alkenyl, $C_3$-$C_{10}$-cyclolalkyl, $C_3$-$C_{10}$-heterocyclyl, $C_3$-$C_{10}$-heterocyclyl-$C_1$-$C_{10}$-alkyl, $C_6$-$C_{10}$-aryl, $C_6$-$C_{10}$-aryl-$C_1$-$C_{10}$-alkyl, $C_2$-$C_{10}$-heteroaryl, $C_2$-$C_{10}$-heteroaryl-$C_1$-$C_{10}$-alkyl, and $C_1$-$C_{10}$-alkoxy-$C_1$-$C_{10}$-alkyl, each of which radicals is optionally substituted by halogen, cyano, nitro, $C_1$-$C_6$-alkyl, oxo, acyl, or $C_3$-$C_6$-cycloalkyl, with the heteroatom being selected from N, O and S, or $R_1$ and $R_2$, together with the carbon and oxygen atoms attached thereto, form a saturated or unsaturated 5- to 10-membered hetero ring, the ring being optionally fused with phenyl, with $R_1$ and $R_2$ being optionally replaced by heteroatoms selected from N, O and S, and being optionally substituted by halogen, cyano, nitro, $C_1$-$C_6$-alkyl, oxo, acyl, or $C_3$-$C_6$-cycloalkyl.

8. The multi-component composition according to claim 7, wherein $R_1$ and $R_2$ are independently from each other and are selected from the group consisting of $C_3$-$C_6$-alkyl, $C_3$-$C_6$-alkenyl, and $C_3$-$C_6$-cyclolalkyl, each of which radicals is optionally substituted by halogen, cyano, nitro, $C_1$-$C_6$-alkyl, oxo, or acetyl.

9. The multi-component composition according to claim 5, wherein $R_1$ and $R_2$, together with the carbon and oxygen atoms attached thereto, form a saturated or unsaturated 5- to 10-membered hetero ring, the ring being optionally fused by phenyl, with $R_1$ and $R_2$ being optionally replaced by N, and being optionally substituted by halogen, cyano, nitro, $C_1$-$C_6$-alkyl, oxo, or acetyl.

10. The multi-component composition according to claim 1, wherein the acidic additive is selected from the group consisting of butyric anhydride, isobutyric anhydride, valeric anhydride, hexanoic anhydride, ε-caprolactone, methacrylic anhydride, isatoic anhydride, 2-acetyl butyrolactone, methyl 2-oxo cyclopentanecarboxylate, and combinations thereof.

11. The multi-component composition according to claim 1, wherein the acidic additive is selected from diketones.

12. The multi-component composition according to claim 11, wherein the acidic additive is selected from compounds having the general formula (V):

$$R_5\text{—C(O)—CHR}_4\text{—C(O)—}R_6 \qquad (V)$$

wherein $R_4$ is selected from H and $C_1$-$C_8$-alkyl, $R_5$ and $R_6$ are independently from each other selected from $C_1$-$C_8$-alkyl and $C_1$-$C_8$-alkoxy, or $R_5$ and $R_4$, or $R_5$ and $R_6$, together with the carbon atoms attached, form a 5- to 8-membered ring or hetero ring, with the ring member optionally replaced by N or O, and the ring member optionally substituted by $C_1$-$C_6$-alkyl, cyano, amino, hydroxyl, or oxo group.

13. The multi-component composition according to claim 1, wherein the acidic additive is selected from 2-acetyl cyclopentanone and/or 1,3-dimethylbarbituric acid.

14. The multi-component composition according to claim 1, wherein the hydraulic binder comprises cement and/or lime.

15. The multi-component composition according to claim 14, wherein the hydraulic binder further comprises aggregates, fillers and/or admixtures.

16. The multi-component composition according to claim 15, wherein the admixtures comprise accelerators, retarders, air entraining agents, defoamers, plasticizers, corrosion inhibitors, bonding agents, or mixtures thereof.

17. The multi-component composition according to claim 1, wherein the amount of the acidic additive is present in the range of 0.01 to 1.5 wt % based on the total weight of the composition.

18. The multi-component composition according to claim 1, comprising
(A) 5-35 wt % of at least one isocyanate component selected from the group consisting of monoisocyanate, polyisocyanate and NCO terminated prepolymer;
(B) 2-20 wt % of at least one polyol;
(C) 2-10 wt % of water;
(D) 0.001-3 wt % of catalyst;
(E) 0.02-1.5 wt % of at least one acidic additive; and
(F) 15-50 wt % of hydraulic binder, based on the total weight of the composition,
wherein the at least one acidic additive is selected from the group consisting of butyric anhydride, isobutyric anhydride, valeric anhydride, hexanoic anhydride, ε-caprolactone, methacrylic anhydride, isatoic anhydride, 1,3-dimethylbarbituric acid, 2-acetylcyclopentanone, methyl 2-oxo cyclopentanecarboxylate, 2-acetylbutyrolactone, and combinations thereof.

19. The multi-component composition according to claim 18, wherein the amount of acidic additive is 0.2-1.5 wt %, and is selected from the group consisting of butyric anhydride, isobutyric anhydride, valeric anhydride, hexanoic anhydride, ε-caprolactone, methacrylic anhydride, isatoic anhydride, 1,3-dimethylbarbituric acid, 2-acetylcyclopentanone, methyl 2-oxo cyclopentanecarboxylate, 2-acetylbutyrolactone, and combinations thereof.

20. A polyurethane/urea cementitious hybrid system comprising the multi-component composition according to claim 1.

21. A process for preparing a flooring, waterproofing, screed, grouting, primer, wall paint, roofing or coating, comprising the steps of
mixing the components (A)-(F) according to claim 1 to form a mixture;
applying the mixture onto a substrate; and
curing the applied mixture to form a flooring, waterproofing, screed, grouting, primer, wall paint, roofing or coating on the substrate.

22. The process according to claim 21, wherein step (1) further comprises the sub-steps of: mixing the components (A)-(E) together, and then adding component (F) to form a mixture.

23. The process according to claim 21, wherein step (1) further comprises the sub-steps of:
(a) mixing the components (D), (E) and optionally part of (C) to form a mixture;
(b) mixing the components (A), (B), (C) or residual of (C) with mixture obtained in sub-step (a) to form a mixture;
(c) adding component (F) to mixture obtained in sub-step (b) to form a mixture.

24. A method for preparing a flooring, waterproofing, screed, grouting, primer, wall paint, roofing or coating, the method comprises applying the multi-component composition of claim 1 onto a substrate; and curing the applied composition.

25. Flooring, waterproofing, screed, grouting, primer, wall paint, roofing or coating obtained by the process of claim 21.

26. A method for preparing a flooring, waterproofing, screed, grouting, primer, wall paint, roofing or coating, the method comprises applying the polyurethane/urea cementitious hybrid system of claim 20 onto a substrate; and curing the applied composition.

* * * * *